United States Patent
Patanian

(10) Patent No.: US 7,143,009 B2
(45) Date of Patent: Nov. 28, 2006

(54) UNIFIED DATA ACQUISITION SYSTEM AND METHOD

(75) Inventor: John Jacob Patanian, Seattle, WA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/013,831

(22) Filed: Dec. 16, 2004

(65) Prior Publication Data

US 2006/0136177 A1 Jun. 22, 2006

(51) Int. Cl.
*G06F 17/40* (2006.01)
*G06F 15/00* (2006.01)

(52) U.S. Cl. ............ 702/187; 702/182; 702/186; 702/188

(58) Field of Classification Search ........ 702/182, 702/186, 187, 188; 700/17, 108, 174, 205, 700/244
See application file for complete search history.

(56) References Cited

U.S. PATENT DOCUMENTS

| 5,227,122 A | 7/1993 | Scarola et al. |
| 5,265,131 A | 11/1993 | Scarola et al. |
| 6,785,633 B1 | 8/2004 | Patanian et al. |
| 2003/0028269 A1* | 2/2003 | Spriggs et al. ............ 700/83 |
| 2004/0102924 A1* | 5/2004 | Jarrell et al. ............ 702/181 |

FOREIGN PATENT DOCUMENTS

| WO | WO 01/06432 A1 | 1/2001 |
| WO | WO 02/054164 A1 | 7/2002 |

* cited by examiner

*Primary Examiner*—Bryan Bui
(74) *Attorney, Agent, or Firm*—Armstrong Teasdale LLP

(57) ABSTRACT

A unified data acquisition system (UDAS) includes a portable computer configured to monitor data from a system installation. The system installation may be a gas turbine, steam turbine, combined cycle, or power generation system installation. The UDAS is also configured to log both raw and processed data from a plurality of data sources at the system installation, and to permit relocation and reconfiguration of the UDAS at a different system installation for monitoring and logging of data at the different system installation.

17 Claims, 42 Drawing Sheets

Fig. 4

Channel Configuration

Channel Tag Name: Rake 102234-2
Serial #1: 03943R
Serial #2: 2
Descriptor: Discharge Rake
Log to Database? ☒
Database Logging Interval: Fast
Turbine: Turbine 8
Alarm Limits: Low 200.00  High 500.00

Device: Netpac 1
Point ID: Card2 Ch5

Hardware ☒ Scaling ☐  Water Leg ☐ Sensor ☒ PSIA ☐

Sensor Type: Thermocouple
Units: deg F

Linear Scaling
Volts Min 0.00    Eng Min 0.00
Volts Max 0.00    Eng Max 0.00

Thermocouple
Thermocouple Type: J
CJR Channel: Rake 102234-CJR
CJR Source: Channel / Static Value
CJR Temperature: 0.00

RTD
RTD Type: American
Ro: 0.00
Excitation Current: 0.00

Active Data
Raw Data: 0.3304
Corrected Data: 356.10000
Units: deg F

Channel Configuration

Unified Data Acquisition System
File  Help

Channel Tag Name: Rake 102234-2
Serial #1: 03943R
Serial #2: 2
Descriptor: Discharge Rake
Log to Database?
Database Logging Interval: Fast
Turbine: Turbine 8
Alarm Limits
  Low: 200.00
  High: 500.00

Device: Netpac 1
Point ID: Card2 Ch5

Hardware ⊠ — 206
Scaling ⊠ — 220
Water Leg ☐ — 224
Sensor ⊠ — 222

Active Data
Raw Data: 0.3304
Corrected Data: 356.10000
Units: deg F

PSIA — 250

Sensor Correction Table   X57

| Raw  | Corrected |
|------|-----------|
| 0.00 | -0.50     |
| 1.00 | 0.543     |
| 2.00 | 1.89      |
| 3.00 | 2.50      |

— 240

Create New Correction Table

Device View

Yokogawa Digital Power Meter Configuration

| Tag Name | Status | Value | Units | Last Update |
|---|---|---|---|---|
| A:Freq_raw | BAD | 0.00000 | Hz | 2/11/2004 9:10:01 AM |
| A:Freq | BAD | 0.00000 | Hz | 12/31/1903 4:00:00 PM |
| A:IntA H_raw | BAD | 0.00000 | Hours | 2/11/2004 9:10:01 AM |
| A:IntA H | BAD | 0.00000 | Hours | 12/31/1903 4:00:00 PM |
| A:IntA M_raw | BAD | 0.00000 | Minutes | 2/11/2004 9:10:01 AM |
| A:IntA M | BAD | 0.00000 | Minutes | 12/31/1903 4:00:00 PM |
| A:IntA S_raw | BAD | 0.00000 | Seconds | 2/11/2004 9:10:01 AM |
| A:IntA S | BAD | 0.00000 | Seconds | 12/31/1903 4:00:00 PM |
| A:W-H A_raw | BAD | 0.00000 | Watt-Hours-A | 2/11/2004 9:10:01 AM |
| A:W-H A | BAD | 0.00000 | Watt-Hours-A | 12/31/1903 4:00:00 PM |
| A:W-H B_raw | BAD | 0.00000 | Watt-Hours-B | 2/11/2004 9:10:01 AM |
| A:W-H B | BAD | 0.00000 | Watt-Hours-B | 12/31/1903 4:00:00 PM |
| A:W-H C_raw | BAD | 0.00000 | Watt-Hours-C | 2/11/2004 9:10:01 AM |
| A:W-H C | BAD | 0.00000 | Watt-Hours-C | 12/31/1903 4:00:00 PM |
| A:Volts A_raw | BAD | 0.00000 | Volts-A | 2/11/2004 9:10:01 AM |
| A:Volts A | BAD | 0.00000 | Volts-A | 12/31/1903 4:00:00 PM |

—124

Close Window

UNIFIED DATA ACQUISITION SYSTEM AND METHOD

BACKGROUND OF THE INVENTION

This invention relates generally to apparatus and methods for data acquisition for performance testing, and more particularly to portable and configurable apparatus and methods for collecting and logging performance data.

Data is collected from turbine and power generation system installations to calculate commercial and technical parameters from such installations. Data is collected from a plurality of sources, including temporary instrumentation and control systems, to make these calculations. Engineers and technicians travel to site to set up the data acquisition and collect data on site. In at least one known method used to monitor installations, calculations are performed in batch mode, so it is possible that an invalid test will not be recognized until after completion of the test. Separate data logs are created for temporary instruments and readings from the control system, thereby making it difficult to analyze time-synchronized data, and requiring additional data processing steps to be performed after the test to analyze the results of the test. Moreover, in at least one known method, data from temporary data acquisition equipment is collected in the form of a spreadsheet, whereas control system data is simultaneously but separately logged. This separate logging required that data from multiple sources be collated and entered into a spreadsheet for subsequent analysis.

BRIEF DESCRIPTION OF THE INVENTION

There is therefore provided, in some configuration of the present invention, a unified data acquisition system (UDAS) that includes a portable computer configured to monitor data from a system installation. The system installation may be a gas turbine, steam turbine, combined cycle, or power generation system installation. The UDAS is also configured to log both raw and processed data from a plurality of data sources at the system installation, and to permit relocation and reconfiguration of the UDAS at a different system installation for monitoring and logging of data at the different system installation.

Also provided, in some configurations of the present invention, is a method for acquiring data for thermal performance testing. The method includes utilizing a portable data acquisition system to monitor data from plurality of data sources at a system installation. The system installation may be a gas turbine, steam turbine, combined cycle, or a power generation system installation. The portable data acquisition system includes a personal computer that is relocatable and reconfigurable for monitoring and logging of data from different system installations. The method further includes logging both raw and processed data from the monitored system installation.

In some aspects of the present invention, a machine readable medium having recorded thereon instructions for acquiring data for thermal performance testing is provided. The instructions are configured to instruct a portable data acquisition system to monitor data from plurality of data sources at a system installation, which is a gas turbine, steam turbine, combined cycle, or power generation system installation. The portable data acquisition system includes a personal computer, and the instructions include instructions for monitoring and logging of data from different system installations. Instructions are also recorded on the medium to log both raw and processed data from the monitored system installation.

In yet other aspects of the present invention, a machine readable medium having instructions recorded thereon for acquiring data for thermal performance testing is provided. The instructions are configured to utilize a portable data acquisition system to monitor data from plurality of data sources at a system installation, which is a gas turbine, steam turbine, combined cycle, or power generation system installation. The portable data acquisition system includes a personal computer, and the instructions include instructions for monitoring and logging of data from different system installations, to log both raw and processed data from the monitored system installation; and to transmit test status and current data to a remote location.

It will be appreciated that configurations of the present invention provide portability and ease of configuration and setup, thereby making it possible to set up and test installations at a variety of different locations simply by setting up and configuring the portable test unit at each location to be tested. Configurations of the present invention can provide sufficient flexibility to use whatever data acquisition instrumentation is available at any given location at any given time, from a defined list. Additional instrumentation can be added as future needs require. Moreover, configurations of the present invention facilitate unification of collected data, i.e., all data can readily be collected into a single database, as well as facilitate viewing of data a remote support engineer or customer witness, and facilitate storage of data relationally on a central server for future studies.

BRIEF DESCRIPTION OF THE DRAWINGS

FIGS. 4, 5, and 6 are screenshots of configurations of other variations of device configuration screens used in some configurations of the present invention.

FIG. 19 is a screenshot of a configuration of a "Scaling Correction" stage that allows a user to specify parameters to scale data.

FIG. 20 is a screenshot of a configuration of a "Water Leg Correction" screen that allows a user to correct pressure reading offsets resulting from vertical displacement of pressure sensors.

FIG. 21 is a screenshot of a configuration of a "Sensor Correction" screen that access a correction table dialog.

Figure 23:
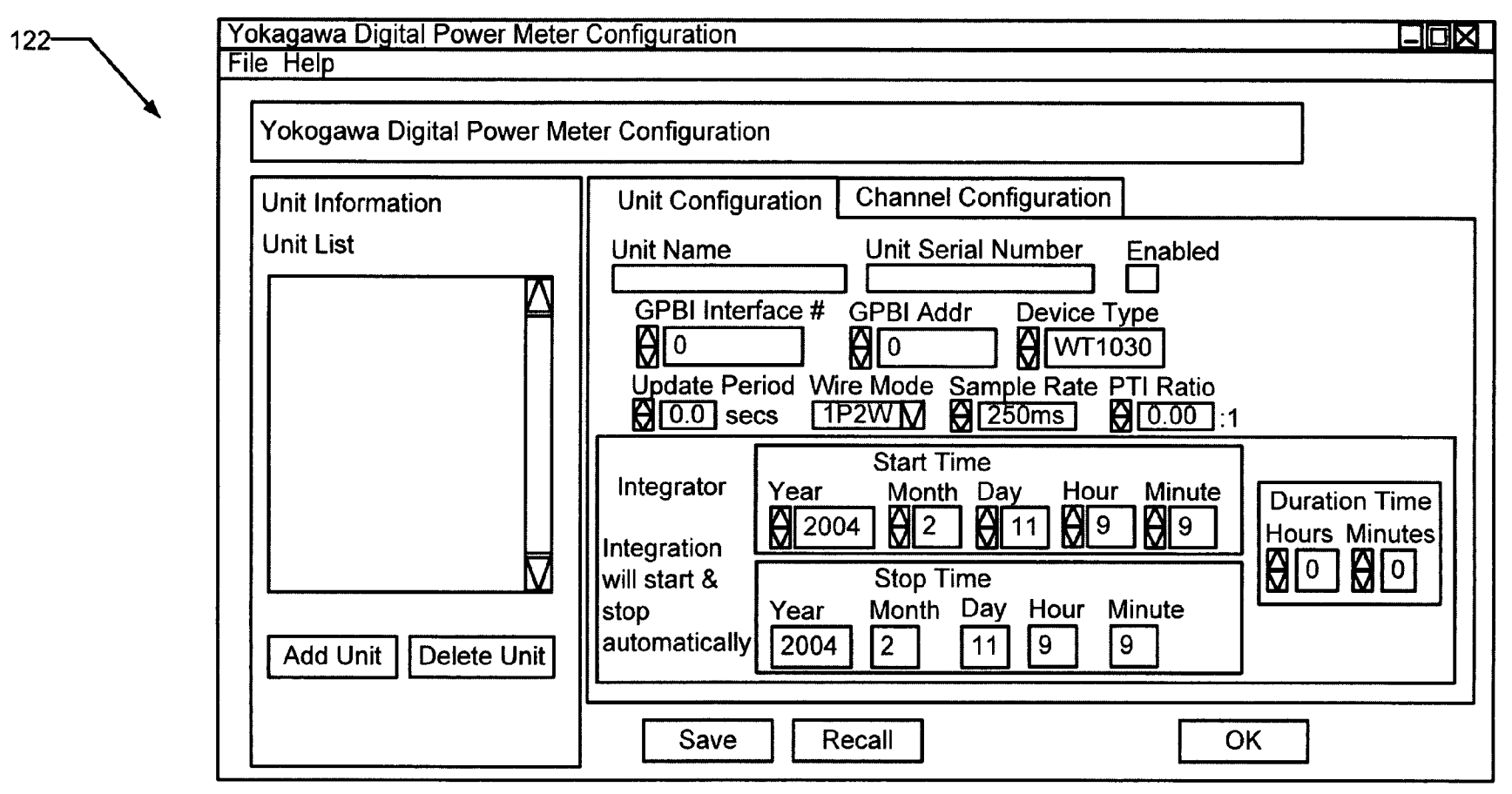

FIGS. 23, 24, 25, and 26 are screenshots of another configuration of device configuration screens suitable for the UDAS configuration of FIG. 1.

Figure 32:
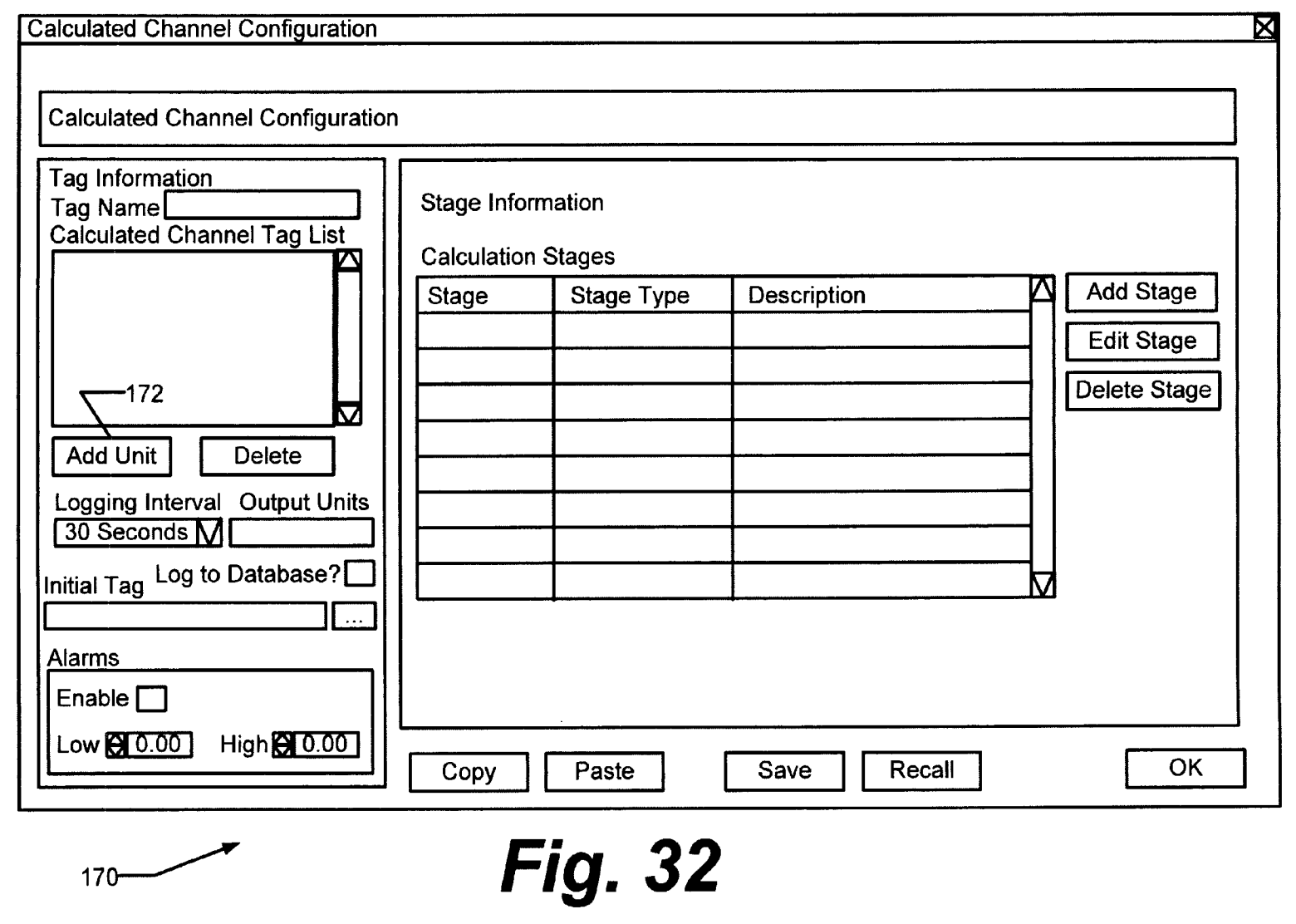

FIGS. 32, 33, 34, 35, 36, and 37 are screenshots of other configurations of various screens for setting up calculation tags suitable for the UDAS configuration of FIG. 1.

FIG. 40 is a screenshot of another configuration of a ""Water Leg Correction" screen.

Figure 1:
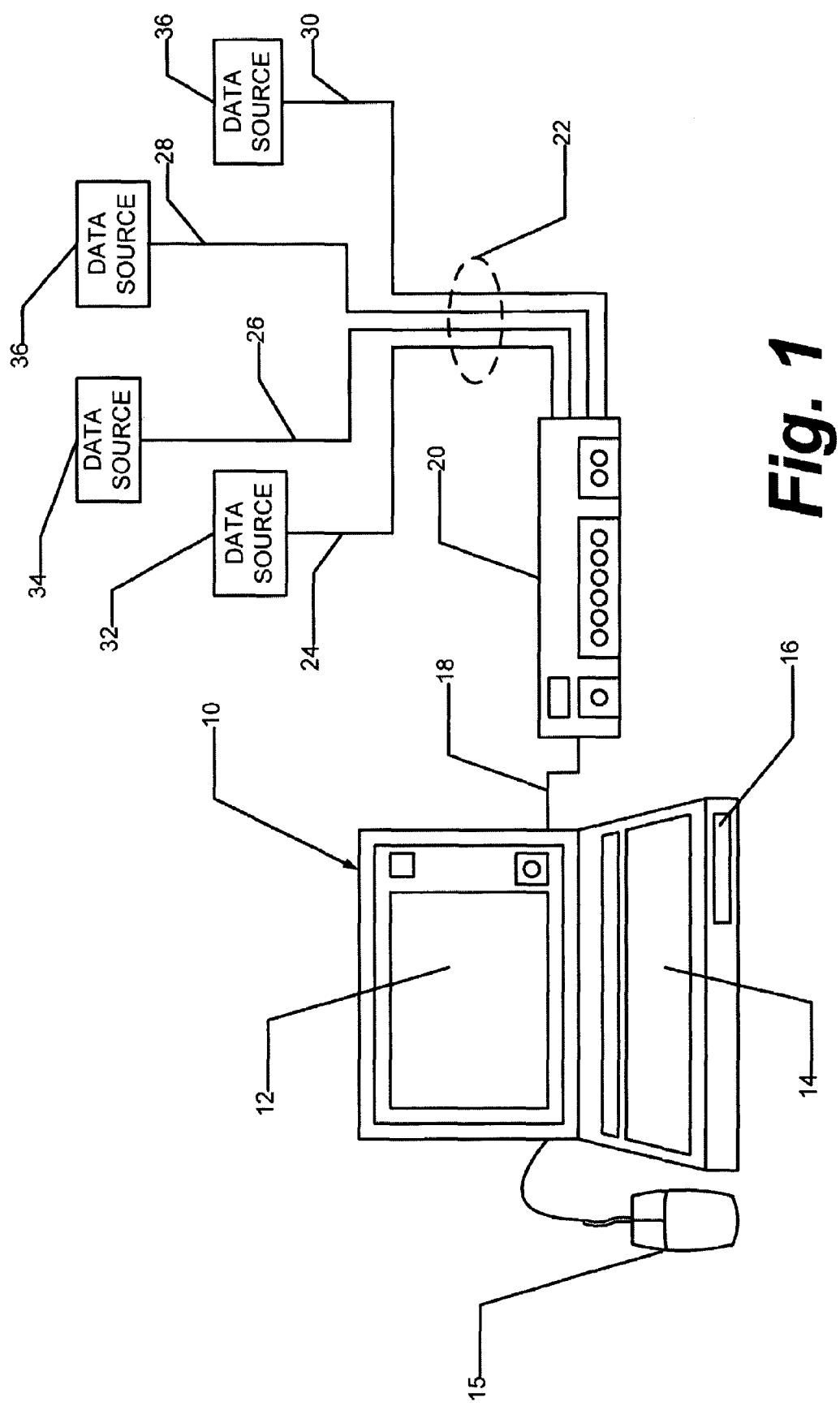
FIG. 1 is a block diagram representative of a configuration of a unified data acquisition system (UDAS) of the present invention deployed as a performance monitor at a system installation.

The layout as well as certain of the content of the various GUI screens used in configurations of the present invention may vary depending upon, for example, the operating system, if any, used by computer 10, the devices being monitored, etc. Thus, all GUI screens shown in the Figures are intended only as non-limiting examples.

DETAILED DESCRIPTION OF THE INVENTION

Some configurations of a Unified Data Acquisition System (UDAS) of the present invention provide a data logging system to monitor and log data from new and existing turbine and power generation system installations. A technical effect of such systems is achieved by a user operating and configuring a computer to customize an interface, the effect of which is the ability to monitor and log data from a large number of different types of sources. Various configurations provide portability and ease of configuration and setup, thereby facilitating set up and testing of new turbine installations in different locations around the world. Some configurations are provided as software that can be run on a single laptop computer, yet such configurations provide a large predefined list of data acquisition instrumentation. Thus, various configurations of the present invention are capable of using a wide variety of data acquisition instrumentation available at a particular time or location. Some configurations of the present invention are modular and scalable to allow the addition of additional instrumentation in the future. Both raw and processed data is logged in some configurations of the present invention. For example, some configurations log raw data to a comma separated variable (CSV) file format and processed data to a personal ORACLE™ database. Test status and current data are viewable from remote locations in some configurations of the present invention. Some configurations of the present invention are particularly suitable for the collection of slow, steady-state data, and provide data collection from between 80 and 400 channels.

As used herein, the term "GUI" refers to a graphical user interface.

Also as used herein, the term "channel" refers to a single point data source retrieved from a data input device.

As used herein, "software" comprises machine readable instructions configured to instruct a processor of a predetermined type to perform a series of instructions, which may vary depending upon decisions made on the basis of data that is may be obtained separately from the software. "Firmware" comprises software that is fixed in a form that cannot easily be altered, such as in a read-only memory. Some computer programs may be supplied entirely in firmware, although changeable data that is used to control the program must, of course, be stored elsewhere. Decisions as to whether a program is executed from firmware or from a alterable medium (such as a hard drive) are design choices that are readily made by one of ordinary skill in the art and form no part of the present invention. Therefore, all computer instructions that are included in configurations of the present invention are referred to as "software."

Also as used herein, the term "sTag" refers to a tag defined in the UDAS, or to a system tag. An sTag can be any source of logged data. An sTag should not be confused with tags defined in device OPC servers. In some configurations of the present invention, when a channel is configured, two sTags are created. One of the created sTag is used to hold raw data from the channel, while the other is used to hold processed or corrected data from the channel.

In some configurations and referring to FIG. 1, a laptop or other type of computer 10 is provided. Computer 10 and its appropriate input/output ports 18, when provided with software configured to provide the functionality described herein, comprises a unified data acquisition system (UDAS) 50. Computer 10 contains a processor and memory, such as random access memory (RAM), read only memory (ROM), and one or more mass storage device (none of which is shown in FIG. 1), as is known in the art for such devices. In addition, computer 10 includes user interface devices, such as a display screen 12, a keyboard 14, and a mouse or other pointing device 15 (which may be built into the case of computer 10 rather than a separately attached device as shown in FIG. 1). Computer 10 may also include a device for reading and/or writing removable media such as a floppy disk drive, CD-ROM or CD-RW drive, or a DVD or DVD-RW drive 16. Software included in some configurations of the present invention may be loaded, for example, from machine-readable media (examples of which are floppy disks, CD-ROMs, CD-RWs, DVDs, and the like) onto computer 10 using drive 16, or via a network interface or other type of data interface not shown in FIG. 1. In some configurations of the present invention, software is preloaded onto an internal storage device of computer 10, or may be loaded (or copied to internal storage) from a USB flash ROM storage device. In some configurations, a machine readable medium having instructions recorded thereon for acquiring data for thermal performance testing is supplied. The medium may comprise, for example, any of the removable and/or fixed storage media mentioned above, or other types of media. (As used herein, the term "machine readable medium" is intended to encompass configurations having a single medium or plural media, irrespective of whether the plural media are the same or different. As a non-limiting example, a "machine readable medium having instructions recorded therein for acquiring data for thermal performance testing" includes within its scope a configuration in which the instructions are spread across two floppy disks and a CD-ROM.) Basic techniques for loading and/or starting the execution of software programs are operating system dependent, but are known in the art for various operating systems and need not be described in detail here. Dedicated configurations (for example, one in which computer 10 always immediately boots into a configuration of the software described herein) are also possible, including, for example, configurations in which a general purpose operating system (for example, an operating system that would run other software programs) is absent or not accessible to ordinary users. In some configurations, computer 10 is a personal computer or a laptop computer, both of which will be recognized by those skilled in the art as being portable. Thus, UDAS 50 comprises a portable computer 10 that can be configured to monitor data from system installations that can include gas turbine, steam turbine, combined cycle, and/or power generation system installations. UDAS 50 is portable and reconfigurable, so it can be moved and reconfigured to monitor different installations as needed.

Computer 10, via one or more input/output ports 18 (for example, serial, parallel, universal serial bus [USB], Ethernet, etc.) is configured to communicate with one or more data sources 32, 34, 36, and 38 at a system installation. In some configurations, a network bridge 20 or other interface unit is provided to facilitate communication via a plurality of channels 22. In the sample configuration illustrated in FIG. 1, channels 22 comprise interconnections 24, 26, 28, and 30. As described above, some configurations of the present invention communicate via between one and four hundred channels. However, the invention is not limited to any particular number of channels, and no specific limit should be construed either from FIG. 1 or any example configuration described herein.

Some configurations of the present invention comprise a program to control computer 10 that is implemented using LabVIEW version 6.1 software. However, certain particular functions are implemented using calls to external dynamic link libraries (DLLs) in some configurations. The program can comprise a modular software architecture that allows system scalability. Such software configurations facilitate the addition of hardware devices, database interfaces, GUIs, etc., at a later time without requiring the entire software program to be rebuilt. Also, the use of modular software architecture facilitates the addition of modifications and enhancements to existing modules.

Figure 2:
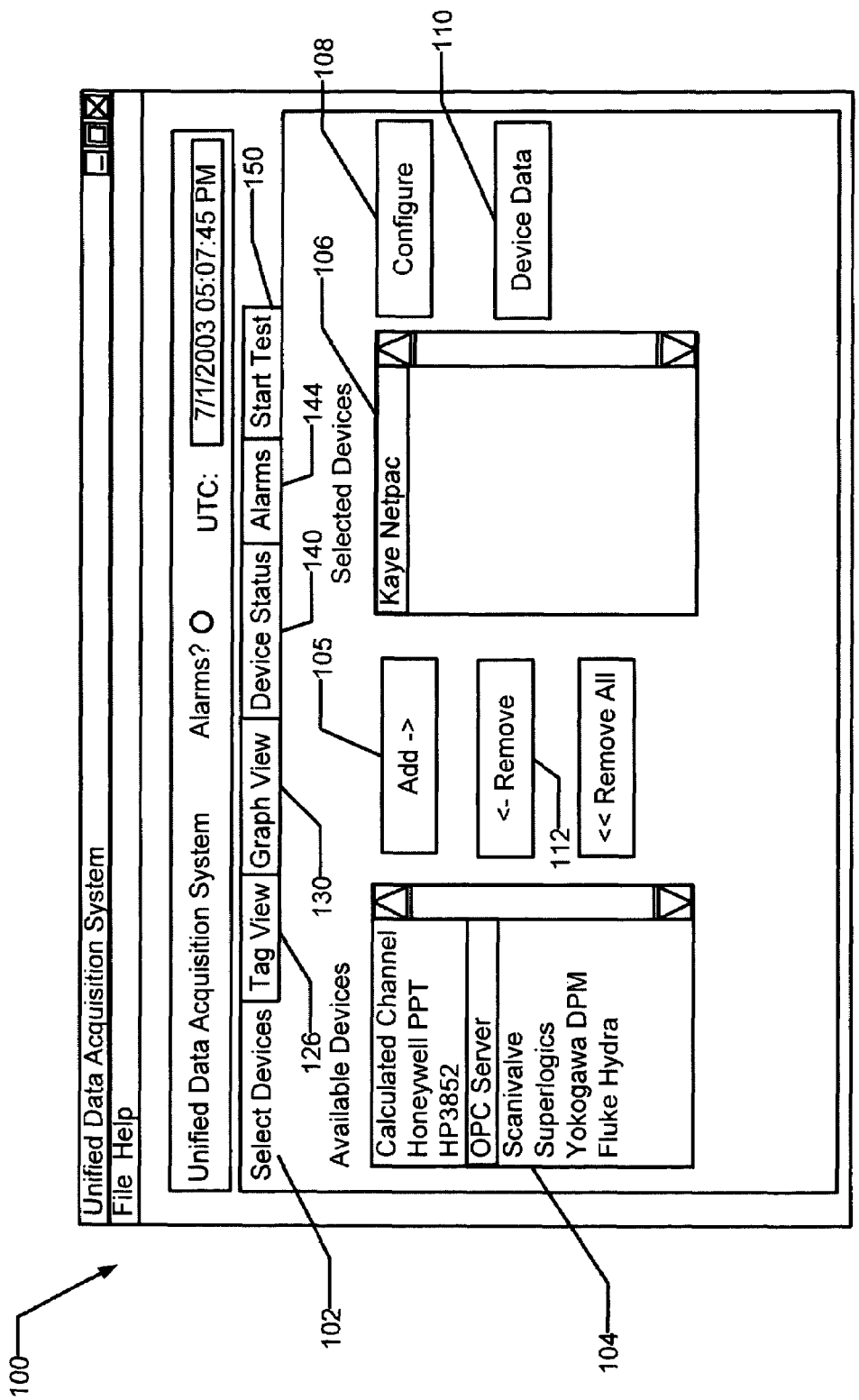
FIG. 2 is a screenshot of a configuration of a main user interface suitable for the UDAS configuration of FIG. 1.

In some configurations of the present invention and referring to FIG. 2, a main user interface 100 is provided and displayed on screen 12 (see FIG. 1) that includes a plurality of selectable tabs. For example, a "Select Devices" tab 102 in some configurations allows a user to select data input devices from a list 104 of such devices that can be used for data collection. After adding a device to a list of selected devices 106 utilizing button 105, the device can be configured by selecting the device in list 106 and selecting button 108 or its raw data can be viewed by selecting button 110. Device configuration and device data view screens are device dependent in some configurations, and the user is able to provide a descriptive name for each selected device. Thus, for monitoring and logging of data from different monitored installations, UDAS 50 is reconfigured utilizing a graphical user interface to utilize a plurality of data acquisition instrumentation from a predefined list of such data acquisition instrumentation.

A "Remove" button 112 removes a device that is selected by the user from the current configuration. When a device is removed, all of the sTags configured for that device are deleted. In some configurations, the user is asked to confirm that he or she intended removal of the selected device.

A "Device Data" button 110 in some configurations displays a screen showing current raw data for configured sTags of the device.

Figure 3:
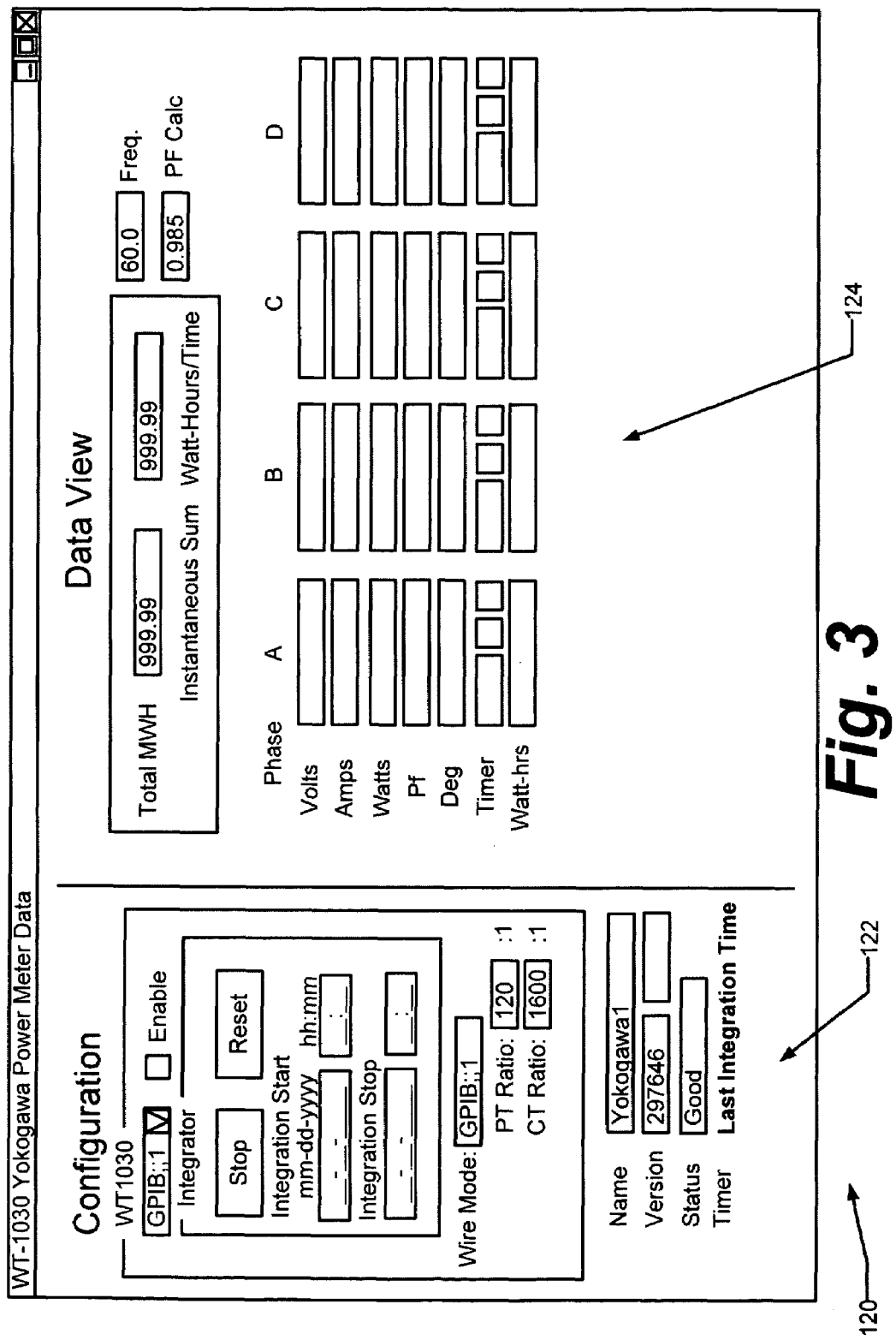
FIG. 3 is a screenshot of a configuration of a device configuration screen suitable for the UDAS configuration of FIG. 1.
Figure 4:
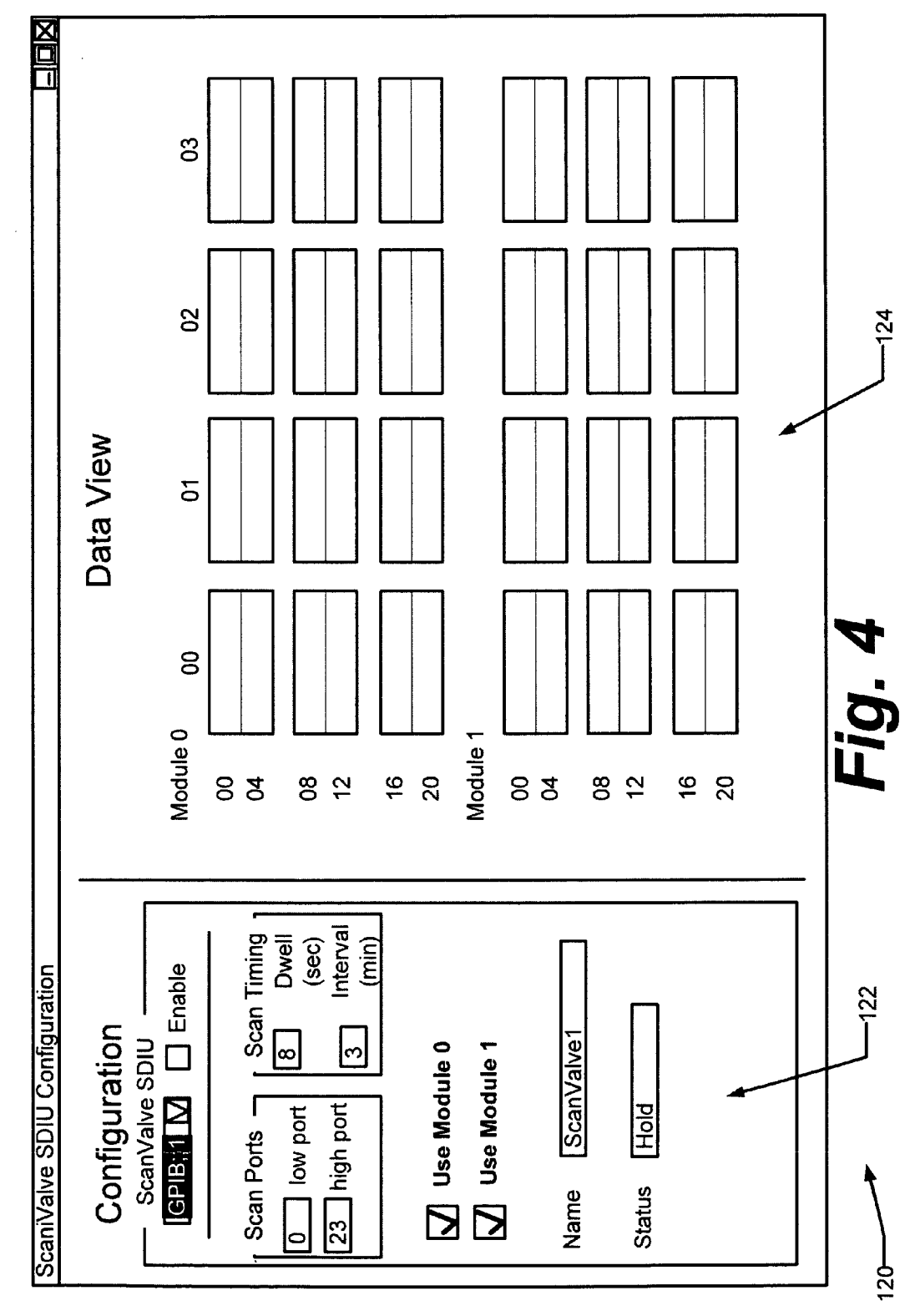
Figure 5:
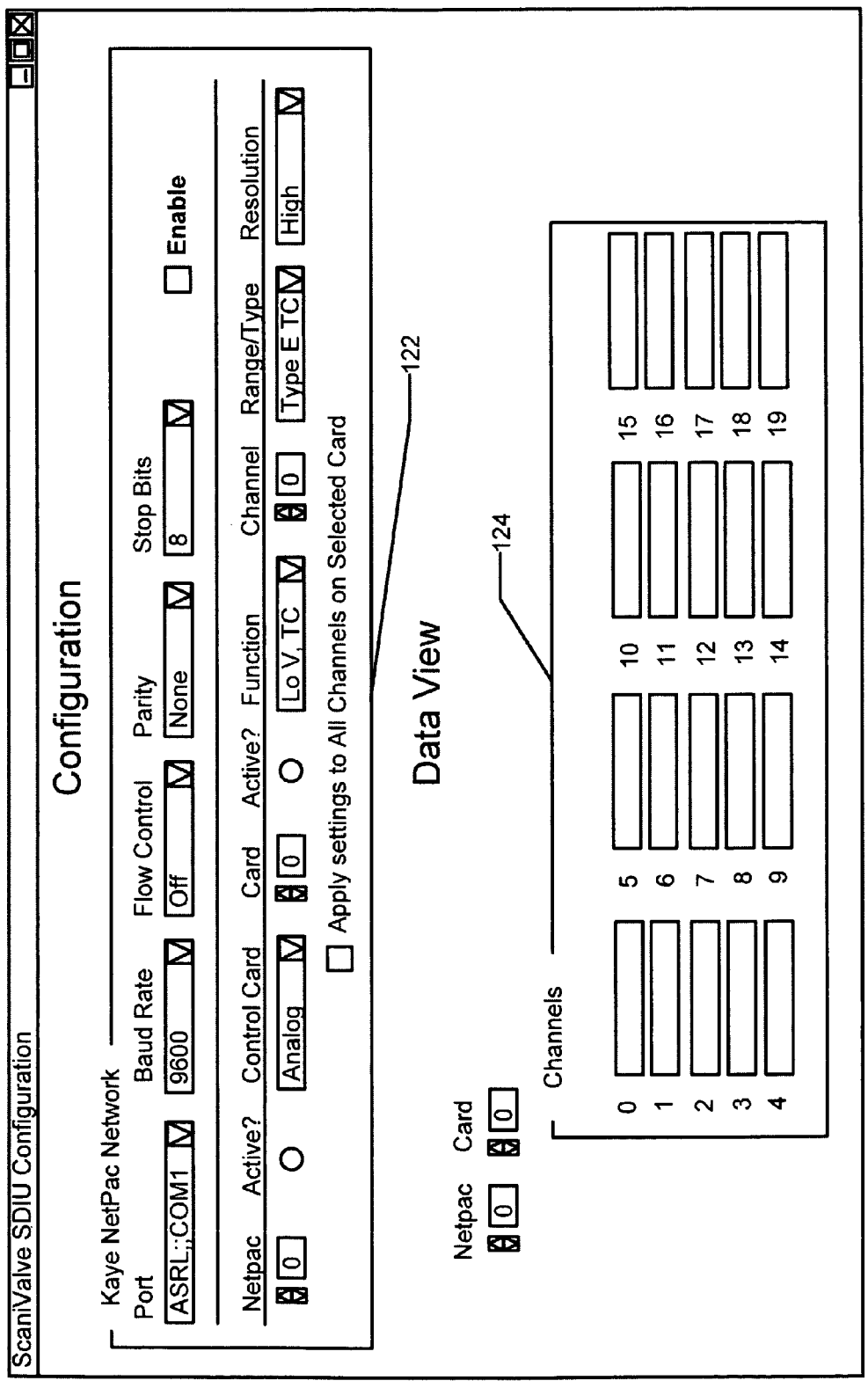
Figure 6:
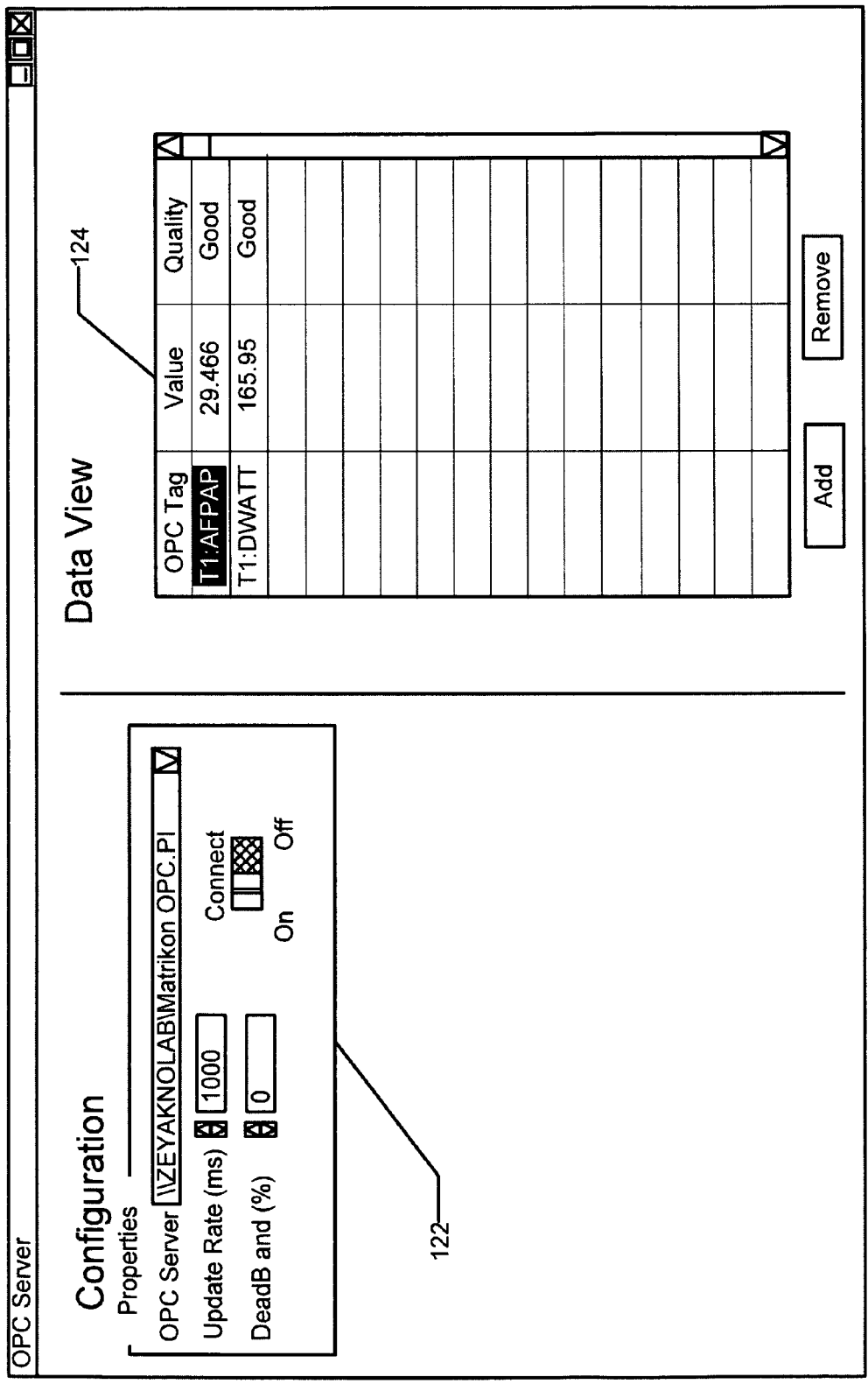

In some configurations and referring to FIG. 3, device configuration screens such as screen 120 provide for selection of configuration options and device data values that will be displayed. A "Configuration" portion 122 and a "Data View" portion 124 of these screens are separated into two separate screens in some configurations. Various other variations of device configuration screens 120 used in some configurations of the present invention are shown in FIG. 4, FIG. 5, and FIG. 6. (It is not necessary that configuration screens 122 and data screens 124 appear in the same window.) Other configurations of device configuration screens that can be used in configurations of the present invention are shown in FIGS. 23, 24, 25, and 26.

Figure 7:
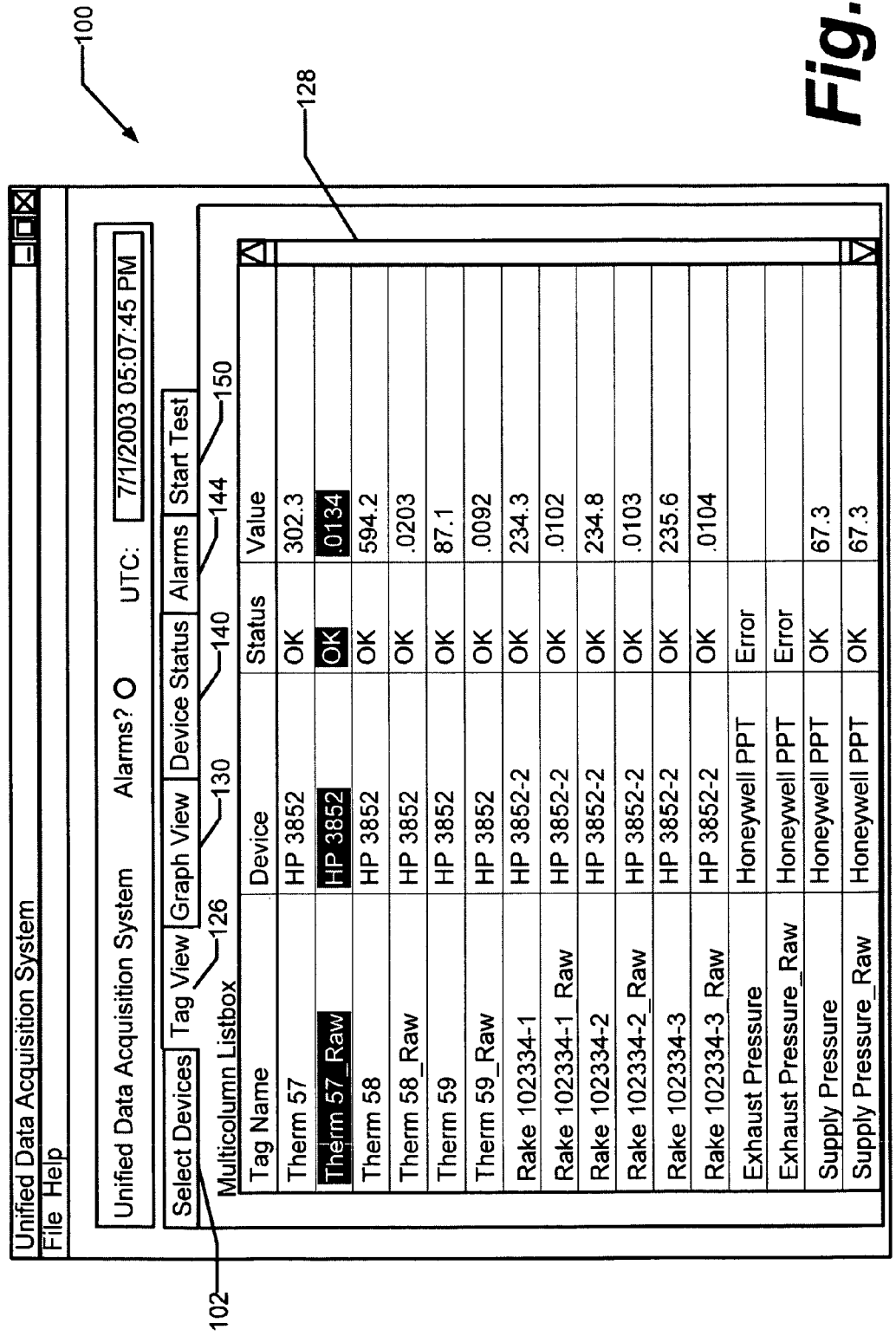
FIG. 7 is a screenshot of a configuration of a "Tag View" screen that permits a user to view processed and raw data in a tabular format.
Figure 27:
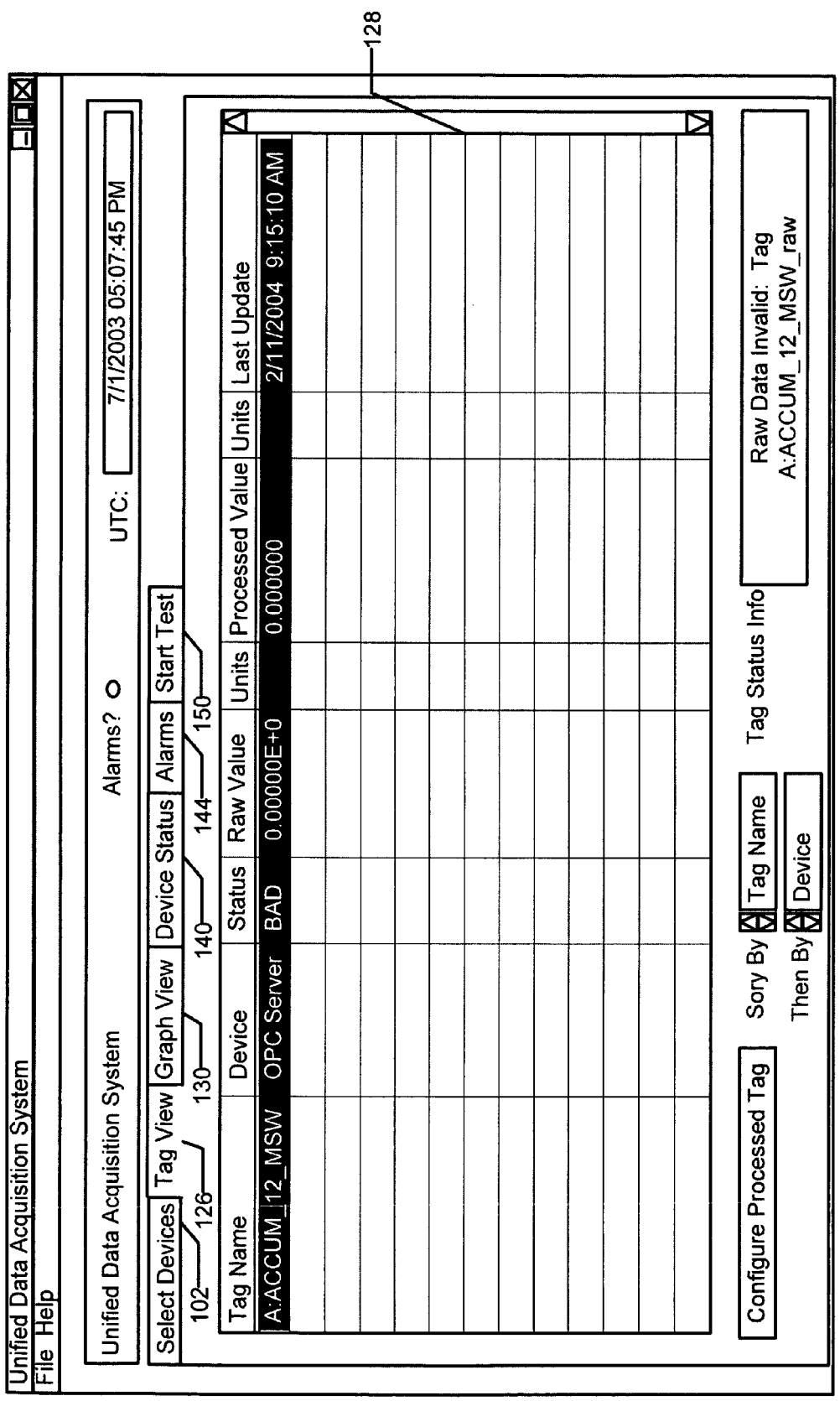
FIG. 27 is a screenshot of another configuration of a "Tag View" screen.

Additional options that can be provided in various configurations of the present invention include CSV logging rate and a method to create and edit sTags for the device's channels. To create an sTag for the device, a user selects a physical device channel or device data source. The user then configures the sTag using a generic configuration screen, which in various configurations is not device-specific. Referring to FIG. 7, a "Tag View" tab 126 provided in some configurations allows the user to view processed (i.e., corrected) and raw data 128 in a tabular format from all sTags defined in the system. The data is updated as quickly as system throughput allows, for example, on the order of once per second. The data displayed is corrected as specified by correction configuration settings of the channel. Thus, data is processed from a monitored installation essentially concurrently as it is received, where "essentially concurrently" means rapidly enough to provide a user with a sense that the processed data is meaningfully representative of current data. FIG. 27 illustrates one configuration of an alternative GUI window that is used in some configurations of the present invention.

Figure 8:
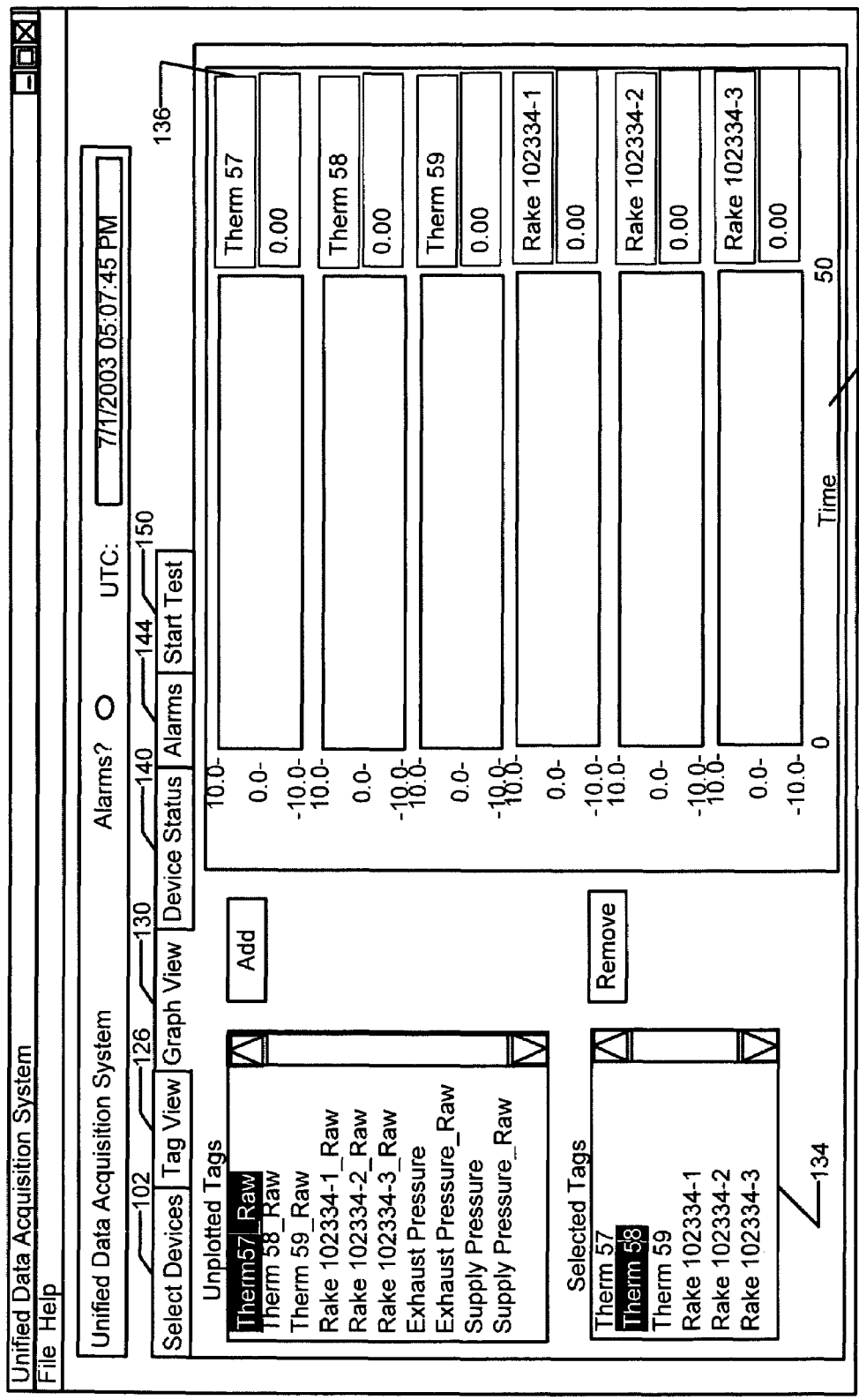
FIG. 8 is a screenshot of a configuration of a "Graph View" screen that allows a user to select a plurality of sTags to view as a graph.
Figure 28:
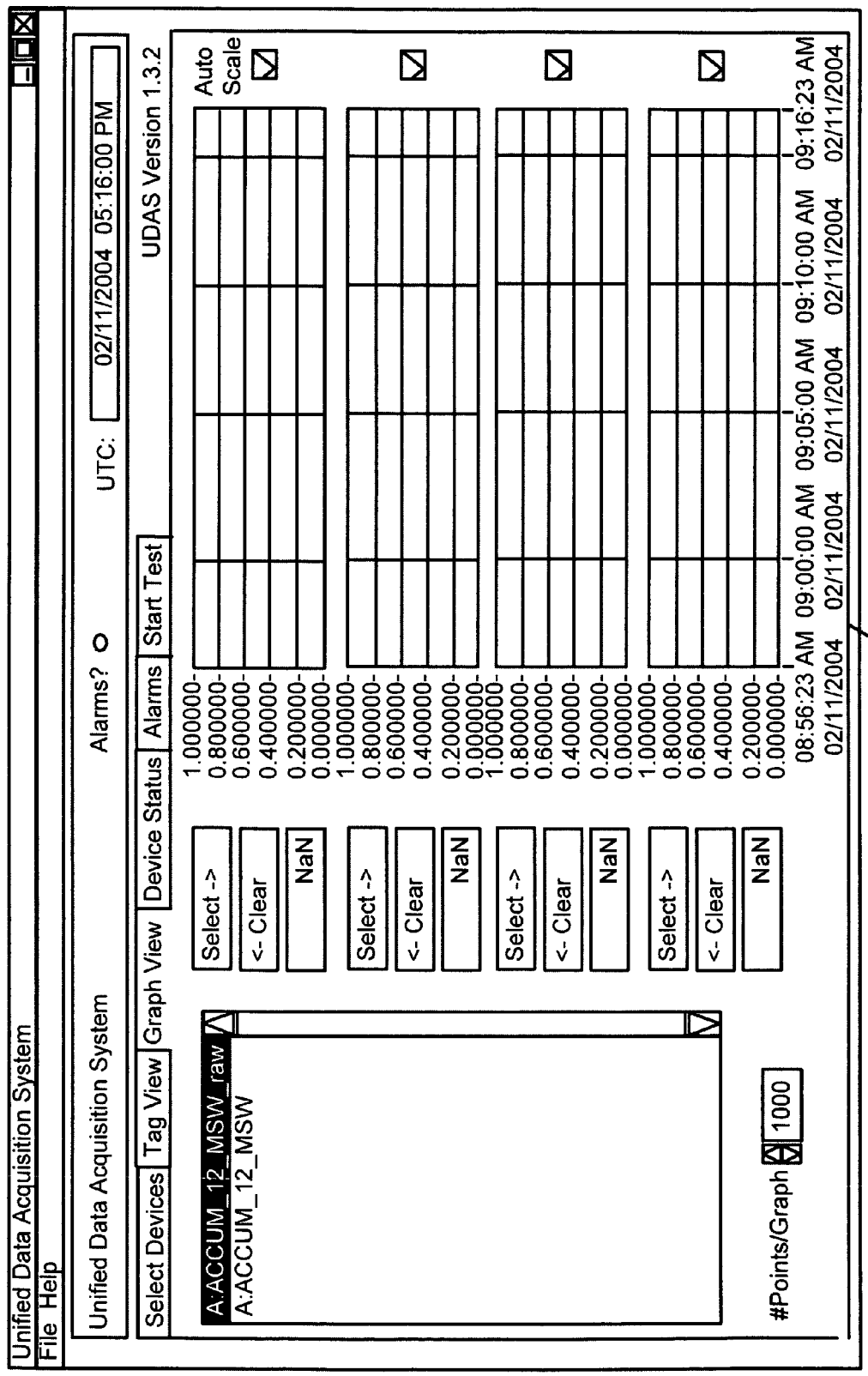
FIG. 28 is a screenshot of another configuration of a "Graph View" screen.

In some configurations and referring to FIG. 8, a "Graph View" tab 130 allows a user to select a plurality (e.g., up to eight) of sTags 134 to view as a graph 136. In some configurations of the present invention, when an sTag is selected, only newly acquired data is displayed on the graph and consequently no data is displayed initially. FIG. 28 illustrates one configuration of an alternative GUI window that is used in some configurations of the present invention.

In some configurations, the user is able to select a single time length for the size of all X-axes 132. All graphs are synchronized to show the same time window. The user can turn Y-axis autoscaling on or off for each graph individually.

Corrected and raw sTags are viewable in some configurations. A digital readout of the most current value and the sTag name is displayed next to each graph.

Figure 9:
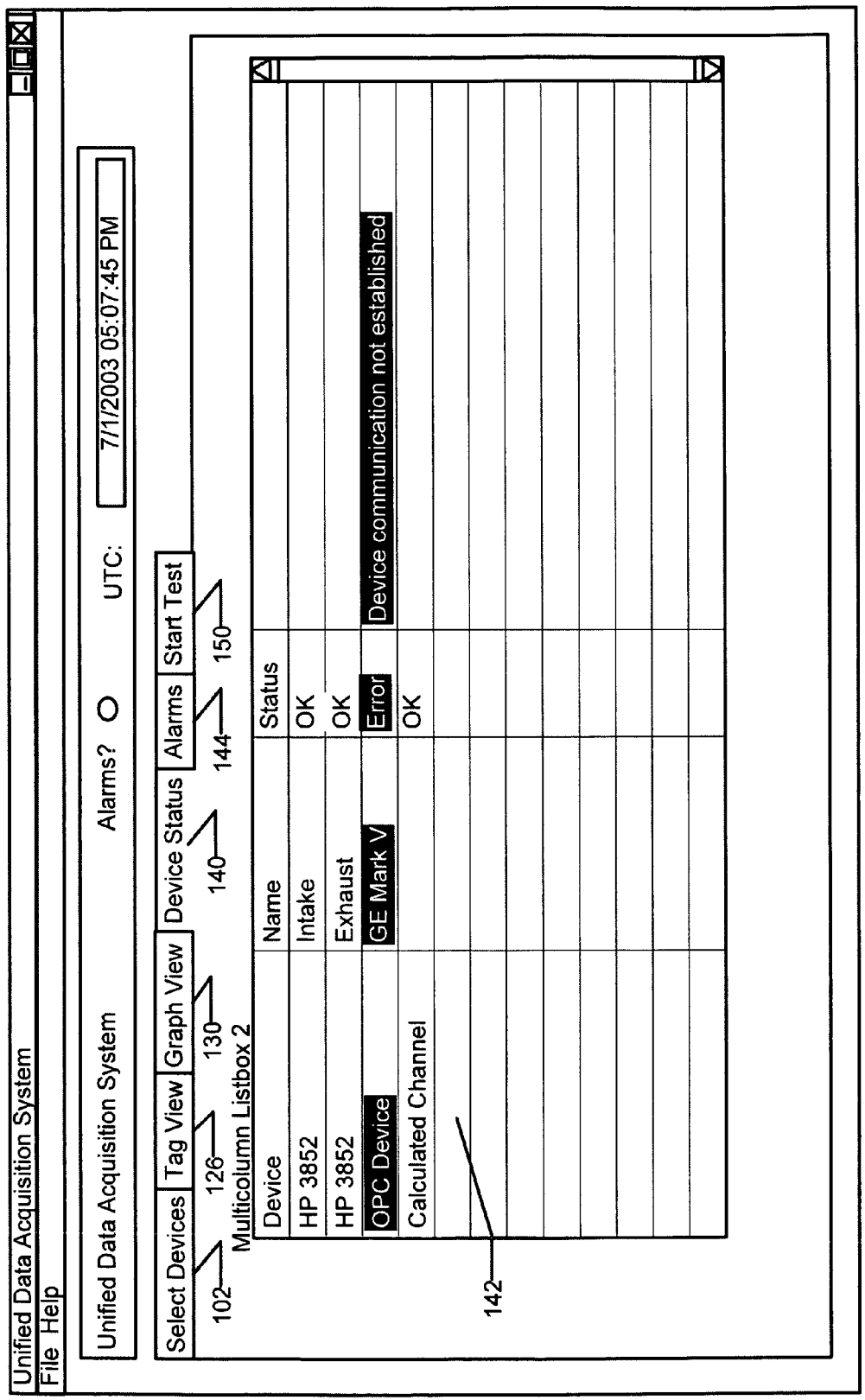
FIG. 9 is a screenshot of a configuration of a "Device Status" screen showing health status of all active data input devices.
Figure 29:
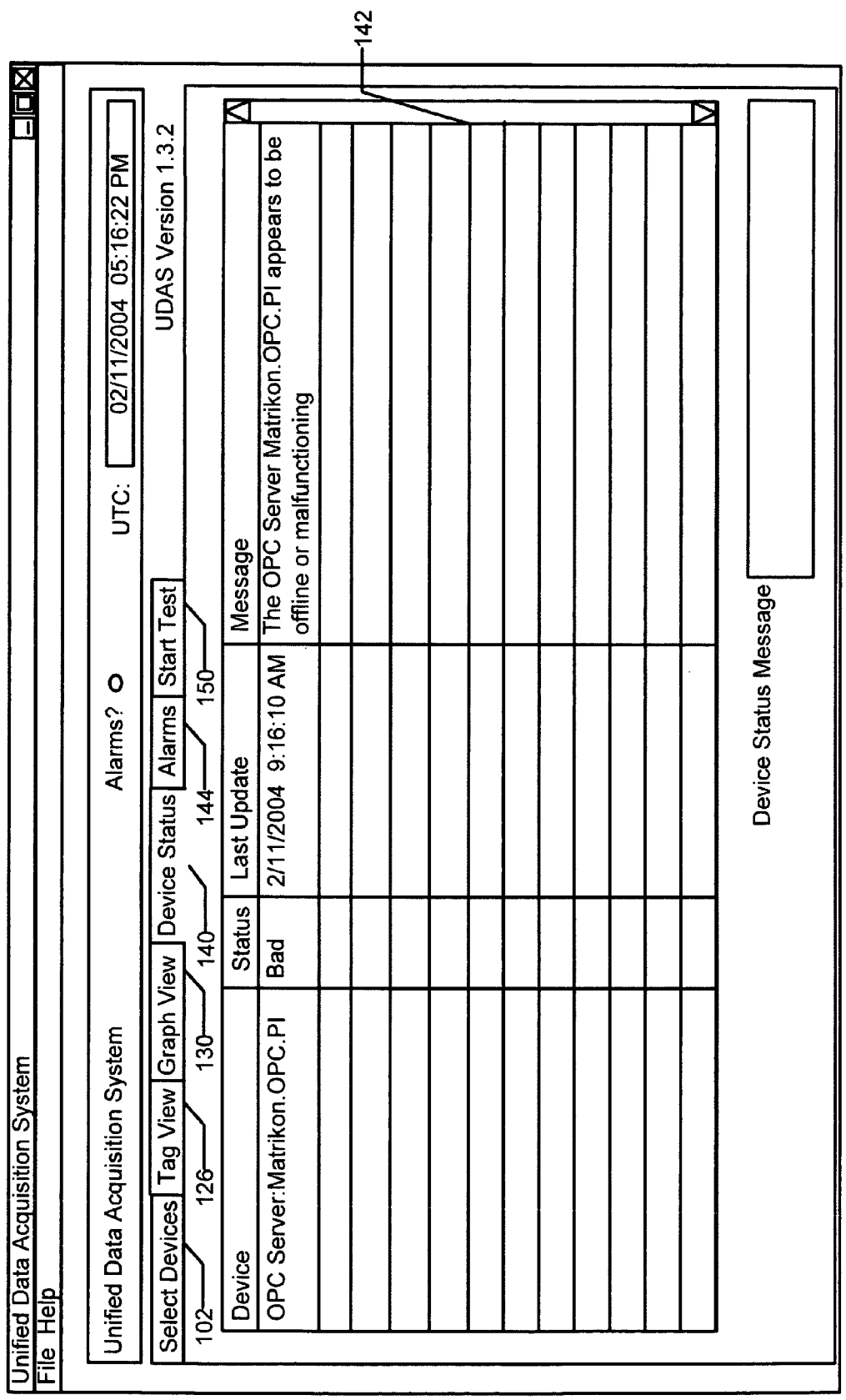
FIG. 29 is a screenshot of another configuration of a "Device Status" screen.

In some configurations and referring to FIG. 9, a device status tab 140 is provided in which a display 142 showing the health status of all active data input devices is available to the user at any time. Device status changes are logged to either an ASCII file or to an ORACLE™ database. FIG. 29 illustrates one configuration of an alternative GUI window that is used in some configurations of the present invention.

Figure 10:
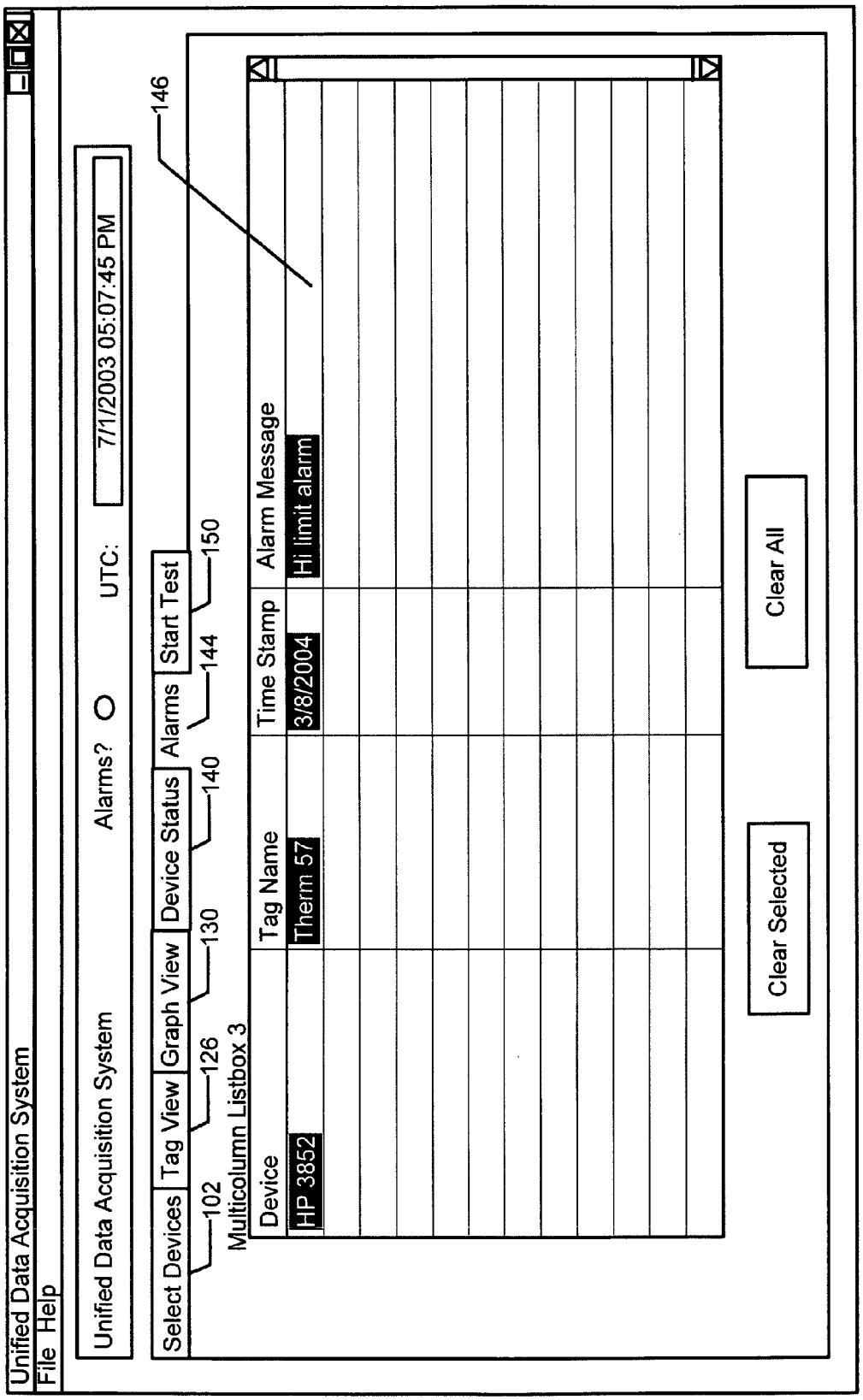
FIG. 10 is a screenshot of a configuration of an "Alarm View" screen.
Figure 30:
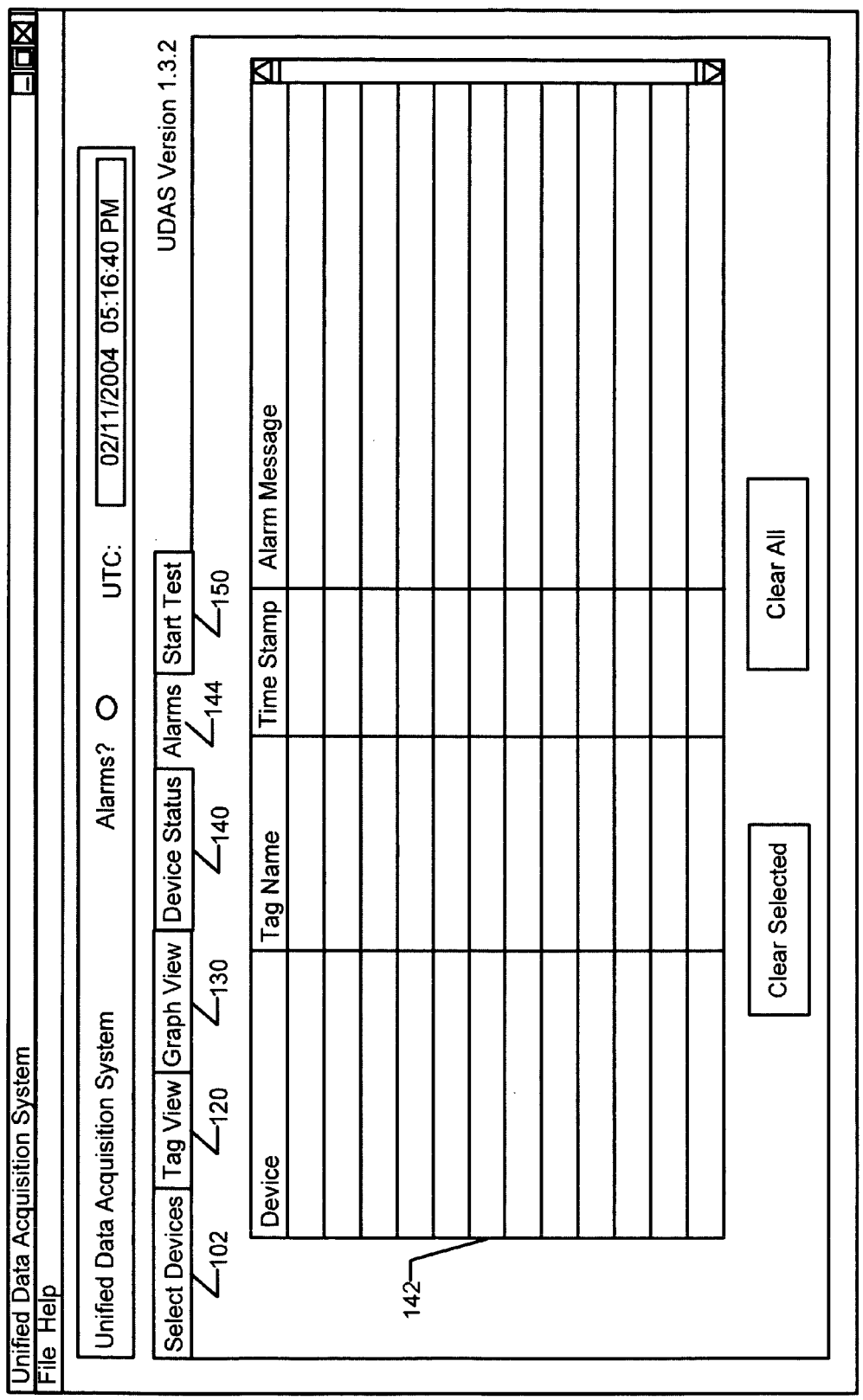
FIG. 30 is a screenshot of another configuration of an "Alarm View" screen.

Also in some configurations and referring to FIG. 10, an alarm tab 144 is provided for viewing an alarm display 146. Alarms are checked at the rate specified for database logging. Only corrected data is checked for alarm conditions. CSV data is not checked for alarms. When an alarm condition occurs, the alarm is displayed on an alarm display 146 that can be selected by the user at any time. Display of the alarm continues until the user clears alarm display 146. Alarms are also logged to an ASCII log file or to the ORACLE™ database. FIG. 30 illustrates one configuration of an alternative GUI window that is used in some configurations of the present invention.

Figure 11:
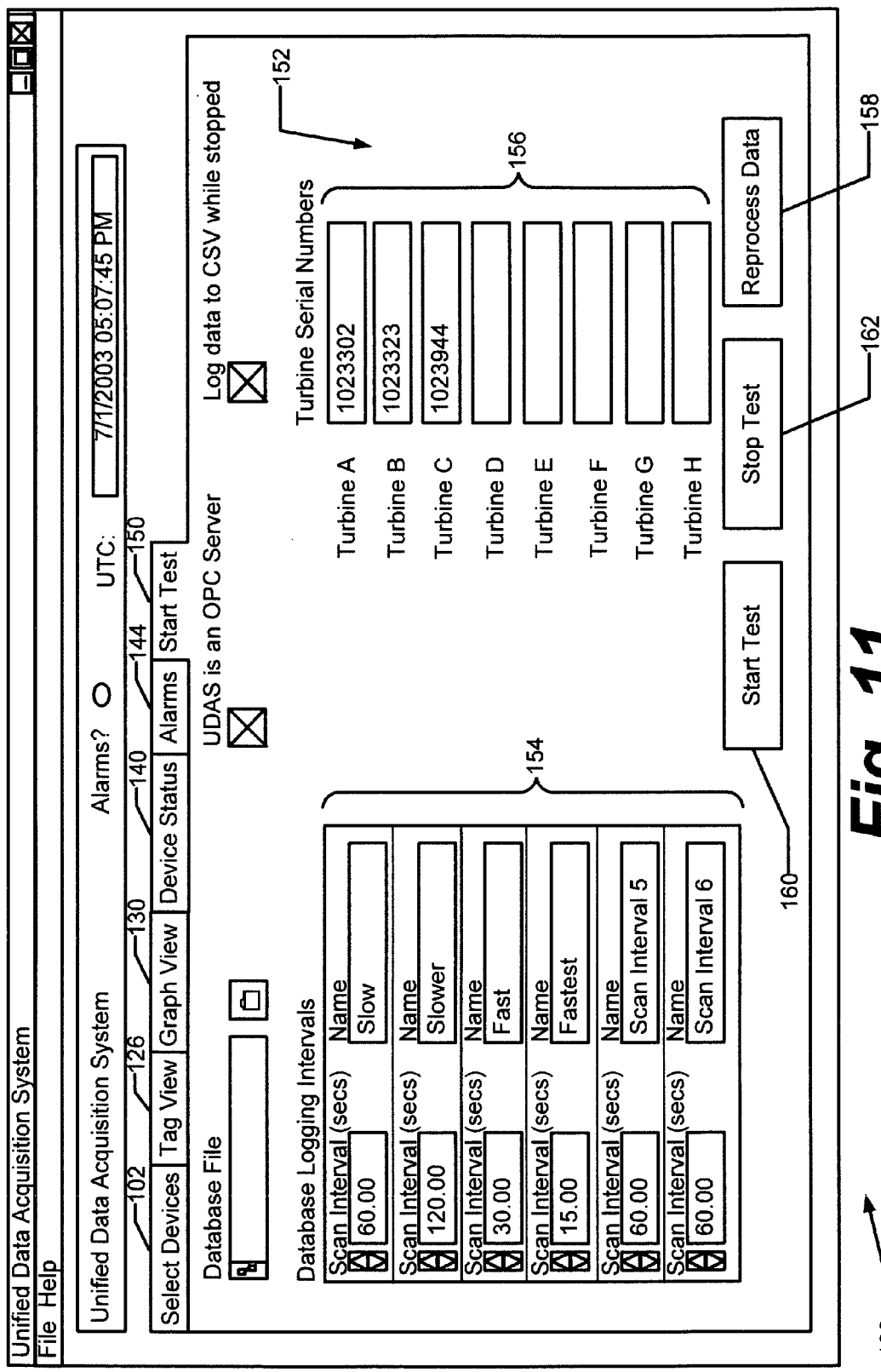
FIG. 11 is a screenshot of a configuration of a "Start Test" screen.
Figure 12:
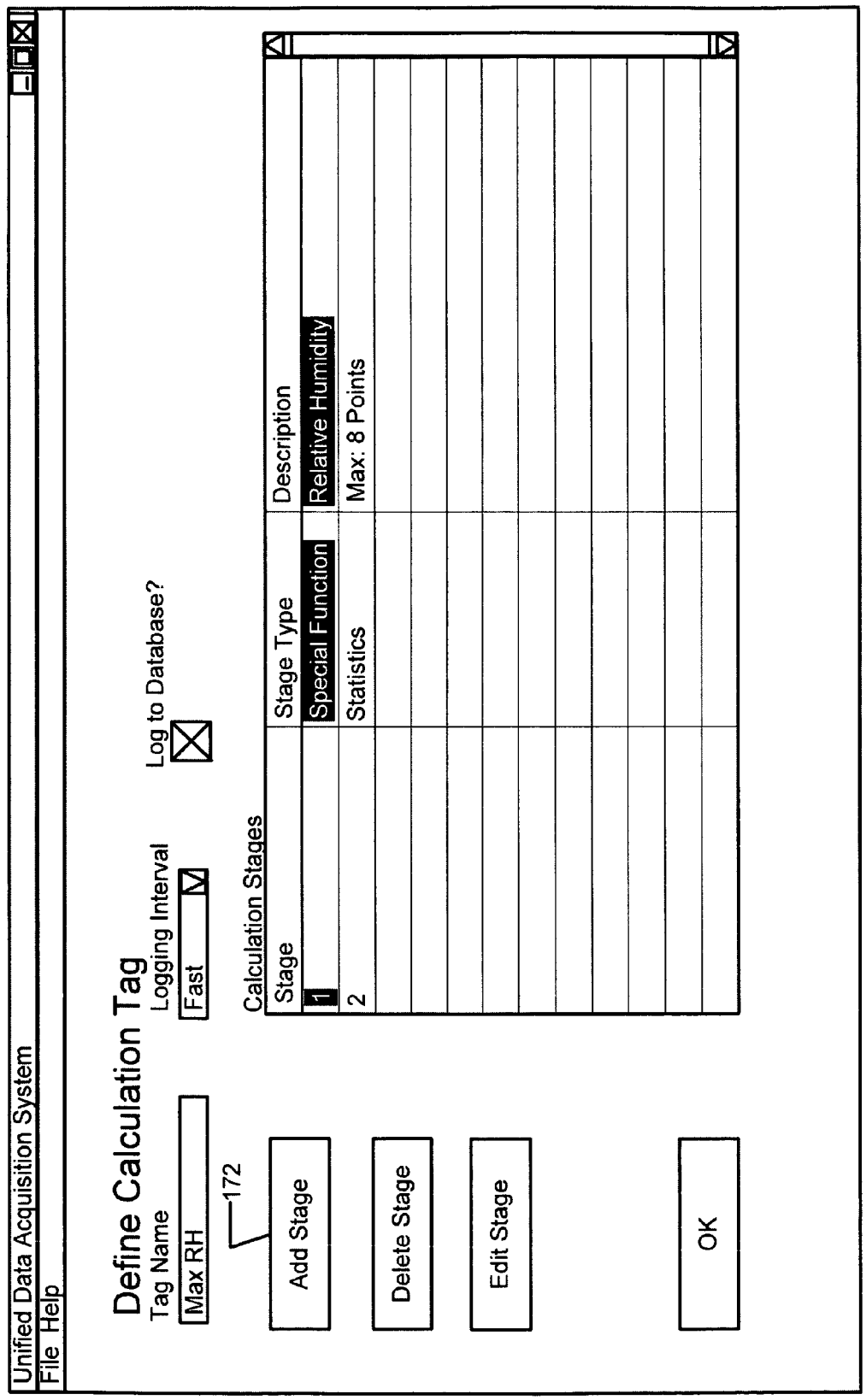
FIGS. 12, 13, 14, 15, and 16 are screenshots of configurations of various screens for setting up calculation tags suitable for the UDAS configuration of FIG. 1.
Figure 31:
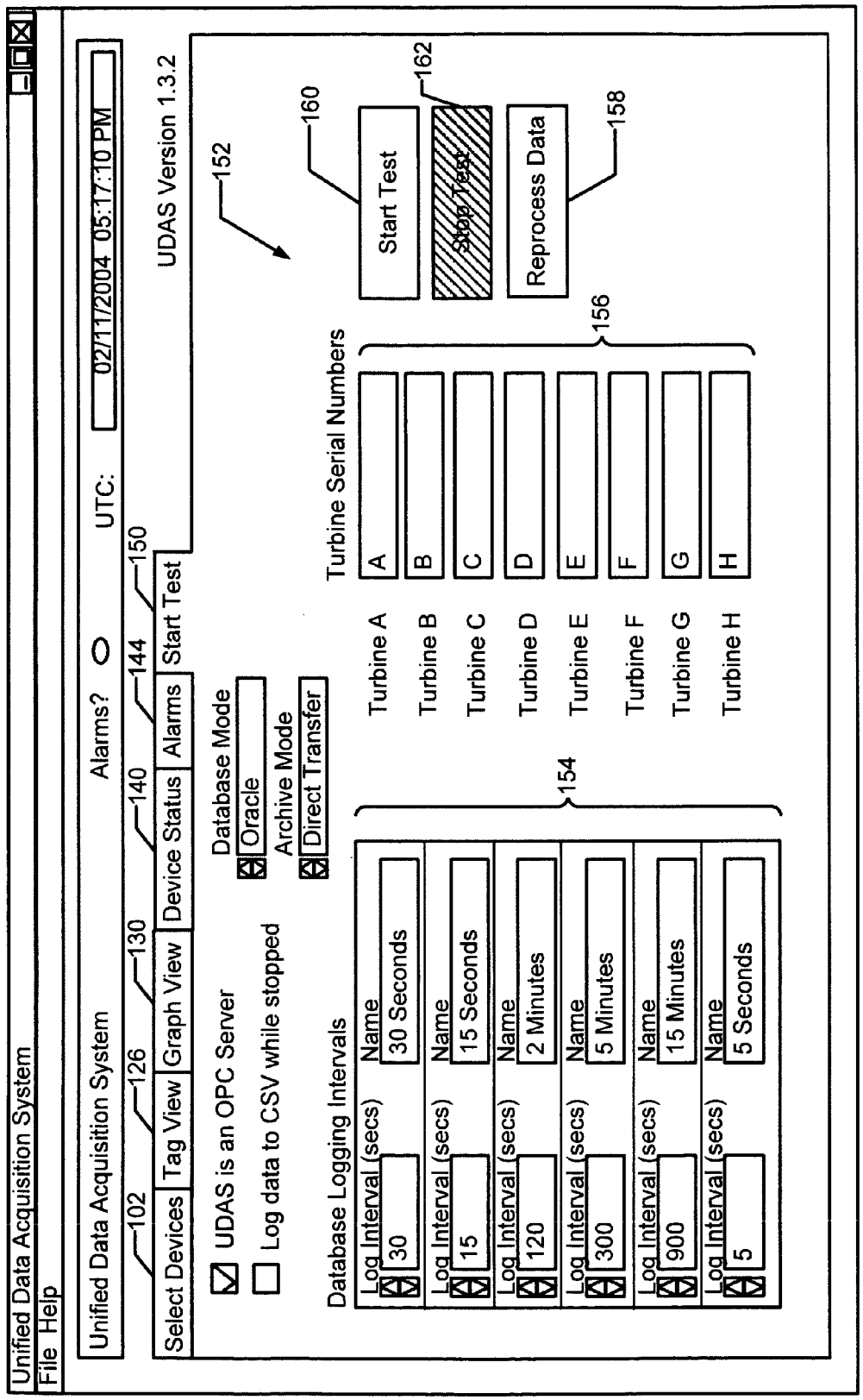
FIG. 31 is a screenshot of another configuration of a "Start Test" screen.
Figure 33:
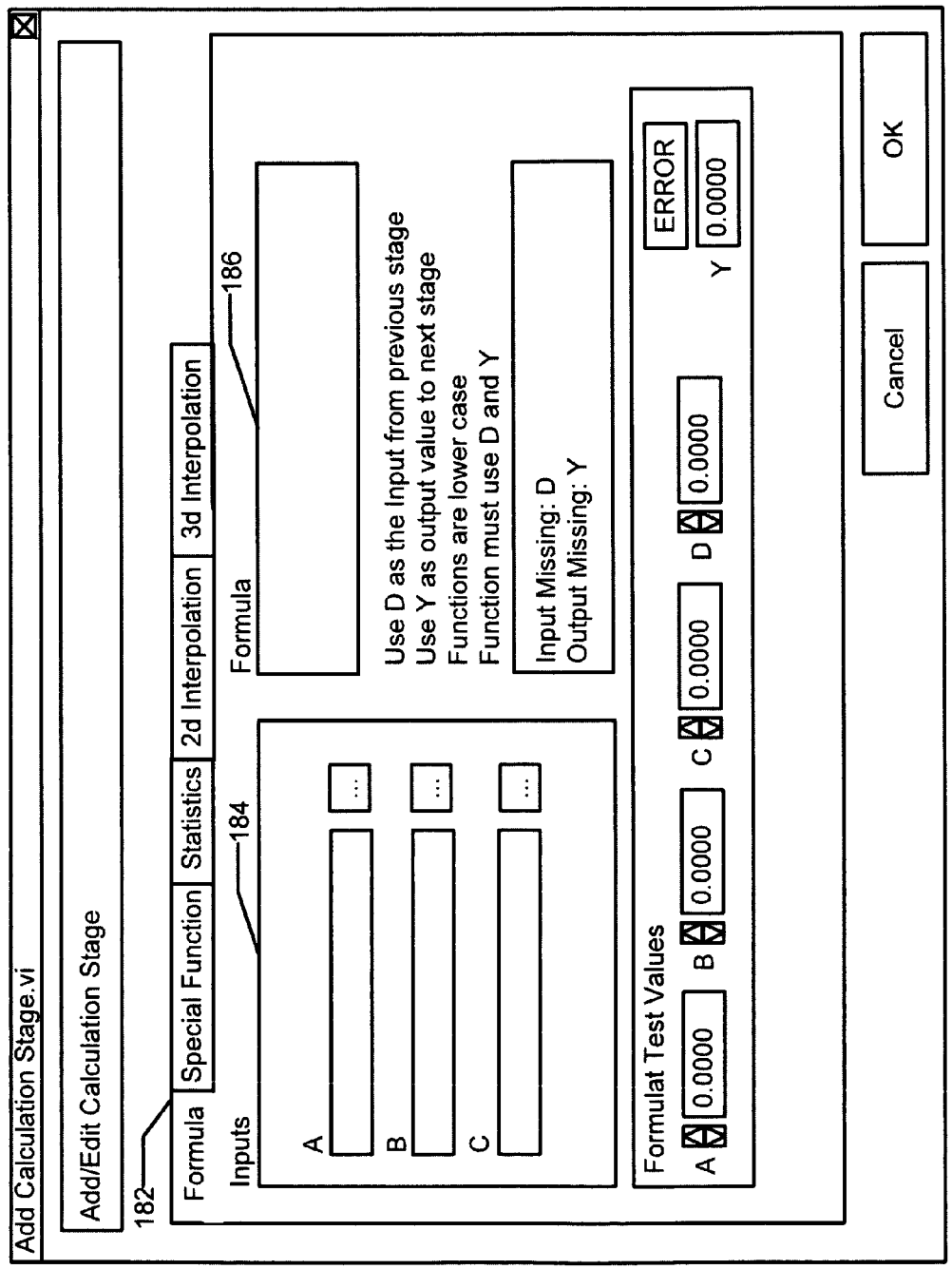
Figure 34:
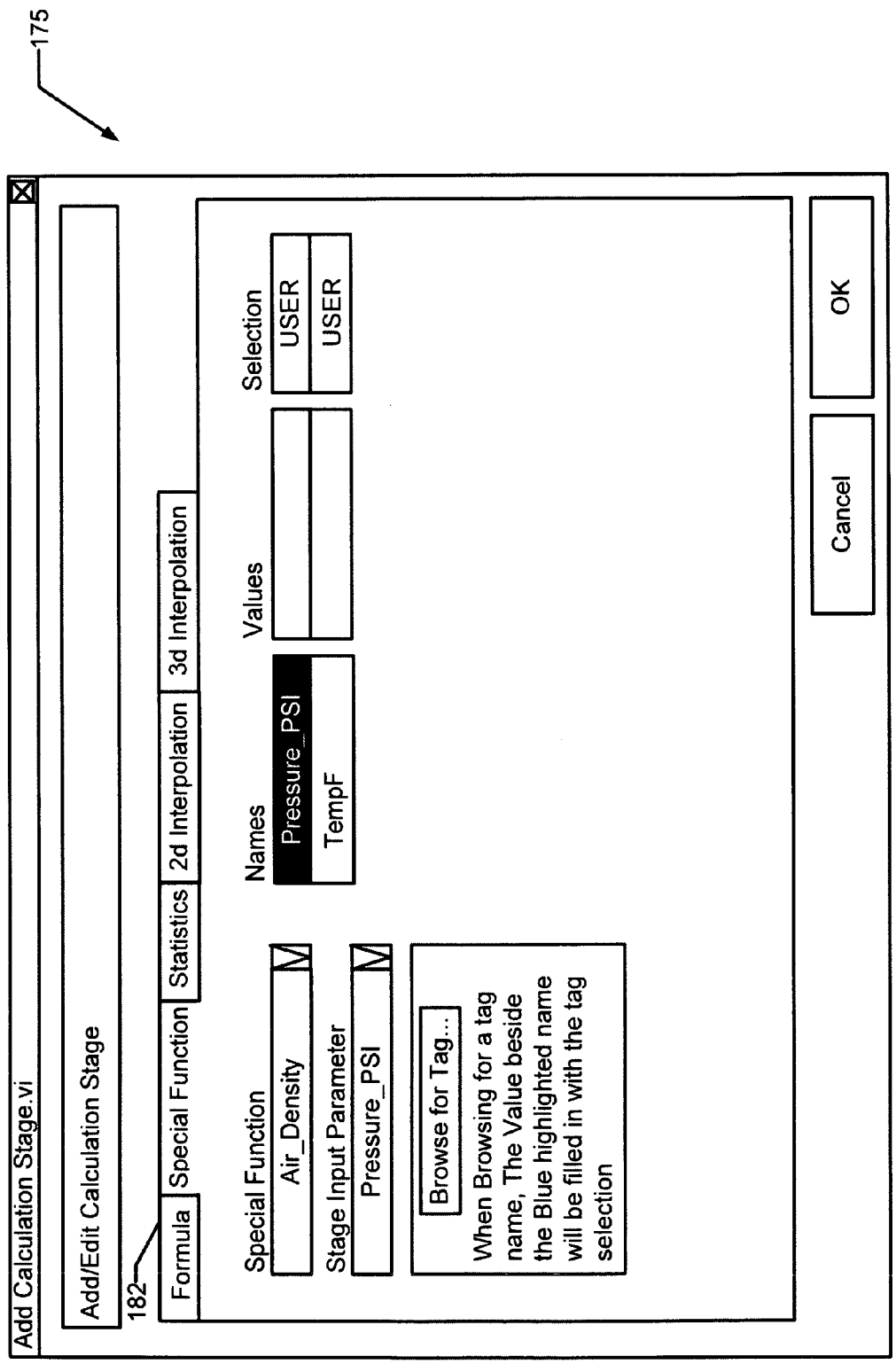
Figure 35:
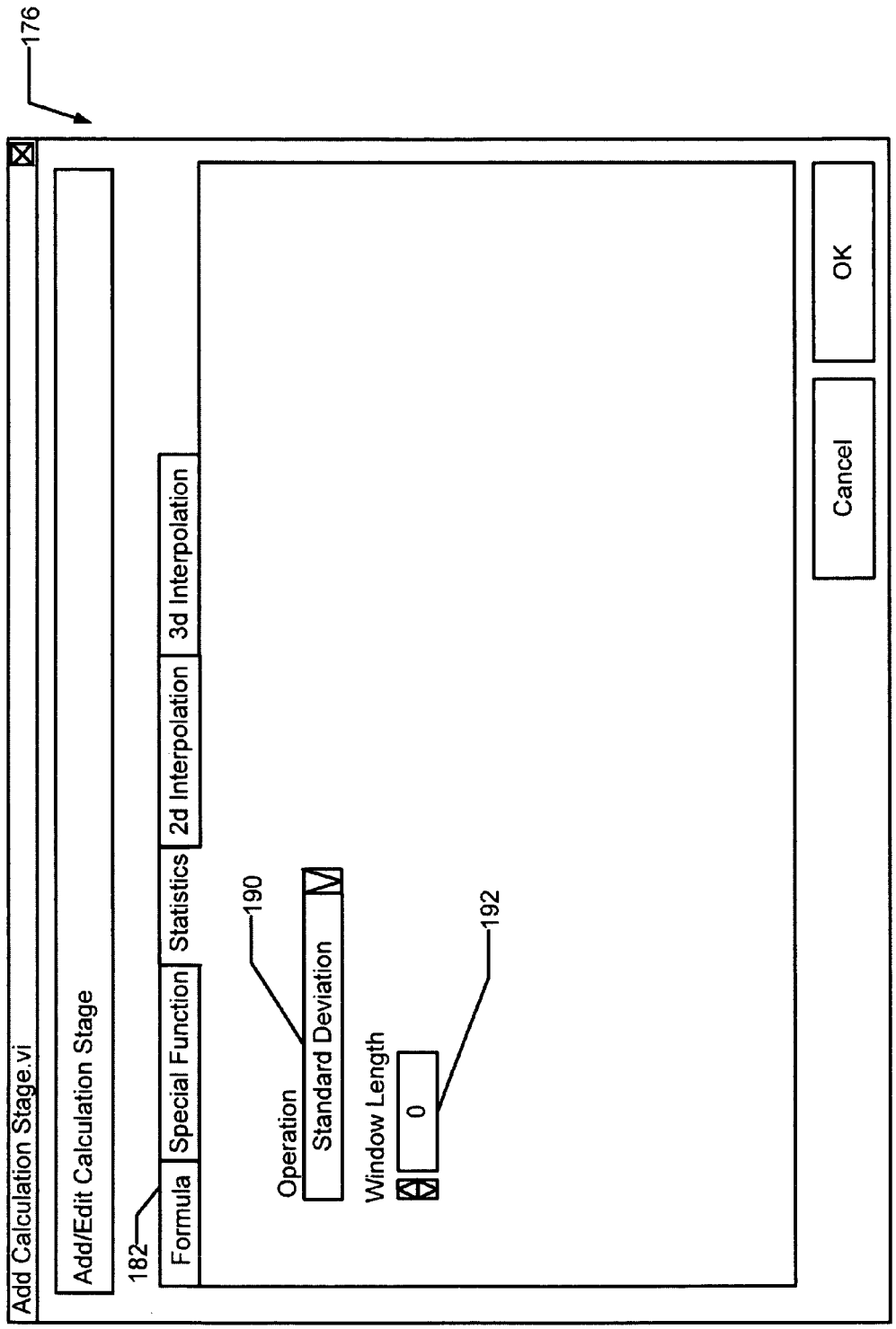
Figure 36:
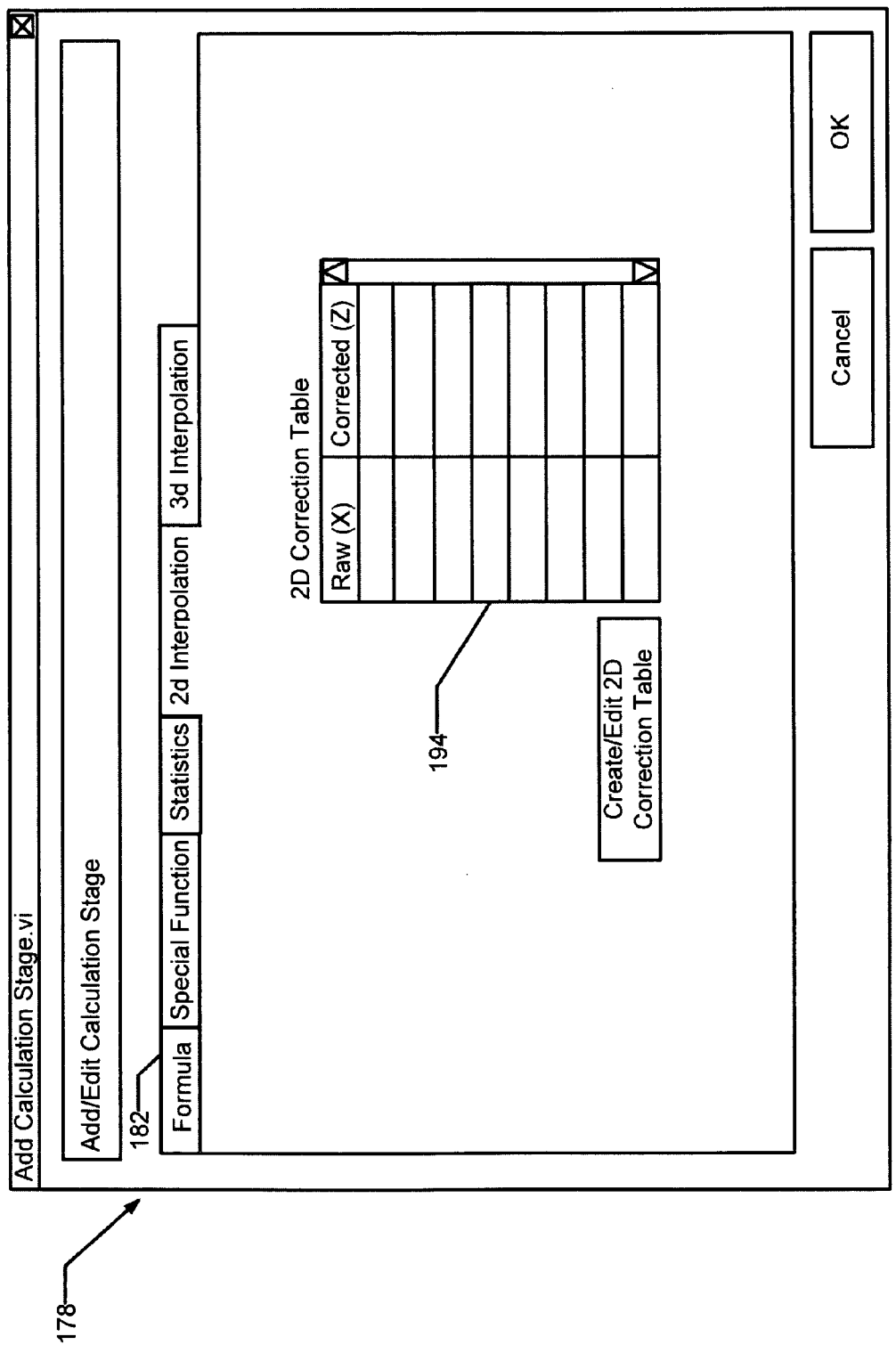
Figure 37:
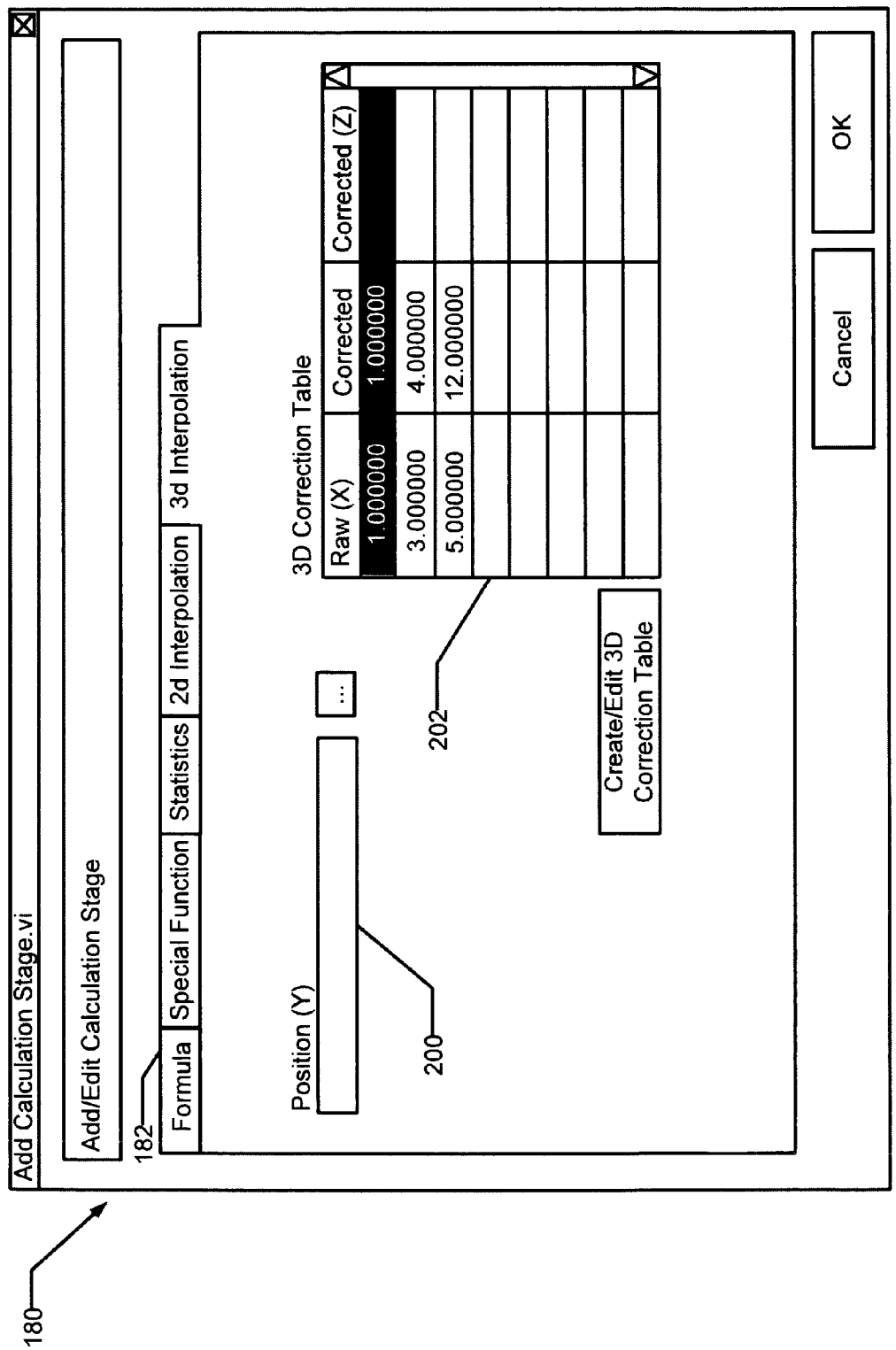

In some configurations and referring to FIG. 11, a "Start Test" tab 150 is provided to access a "Start Test" screen 152. (FIG. 31 illustrates one configuration of an alternative GUI window that is used in some configurations of the present invention.) The "Start Test" screen provided in some configurations specifies parameters required to log data to the ORACLE™ database. The user can enable or prevent the system from serving data as an OPC server. Some configurations allow a plurality of database logging intervals 154 to be named and specified. In a configuration represented by FIG. 11, six logging intervals are provided, one of which can be selected by the user when configuring each channel. A configured channel uses the logging interval of the ordinal of the selected interval name. For example, FIG. 11, a third logging interval 154 is named "Fast" and provides an interval of 30 seconds. When configuring a channel, the user selects the name "Fast" from a pull down menu. If at later time, the user changes the name or time length of the third interval, any channels that were using the "fast" rate will become associated with the new name and the new interval. Thus, these channels are always associated with the third interval regardless of its name.

A plurality (for example, eight) "Turbine Serial Numbers" 156 can be specified in some configurations of the present invention. These serial number are associated by ordinal with each configured channel and calculated tag, in a manner similar to the logging intervals above. The serial number is logged to the database along with each data point logged.

In some configurations, a "Reprocess Data" button 158 is provided that, when selected, prompts for a set of CSV files that are then processed and logged to the database as though the data had been collected in real time. CSV logging and collection of device data is disabled during reprocessing of data. A "Start Test" button 160, when selected, starts database logging and turns on CSV data logging. The process of database logging and CSV data logging cannot be overridden. A "Stop Test" button 162 is also provided in configurations such as those exemplified by FIG. 11.

Remote views of system screens and/or remote control of the system may be provided over the Internet via an Internet connection, for example. However, some configurations of the present invention provide these capabilities via a third party program (e.g., PCAnywhere™). Additionally, since some configuration of the present invention operate as an OPC server, client software is able to connect to the system via a remote-OPC connection. The OPC client software can be another UDAS system running remotely. This functionality allows for remote data viewing capabilities while requiring much less bandwidth than a PCAnywhere™ connection.

Channel tags that have been selected for logging to the database are stored in a local Personal Oracle database. Corrected and raw data are logged. All channels are logged at a rate specified by the configuration of the channel. The maximum rate for logging is dependent on the number of sTags configured, but can be on the order of once a minute. If a user selects a rate that exceeds the maximum permitted rate, some configurations of the present invention log data as quickly as possible but do not necessarily provide an error indication.

Data is logged one point per record. In some configurations of the present invention, the following fields are logged for each record.

---
DATETIME (Timestamp)
TURBINE_SERIAL_NUMBER
SERIAL_NUM1
SERIAL_NUM2
TAG_NAME
MEASUREMENT
UNITS

---

Some configurations of the present invention log only the above information and do not log channel configuration data to the database.

The "DATETIME" field is a timestamp indicating when original data was collected from a data device, as contrasted to the time the data was written to the database. The DATETIME field matches the value stored in the CSV file, regardless of the time at which the data is written to the CSV file or the database.

Each time a test is started, data is appended to an existing database file. If the database file is missing, some configurations of the present invention display an error message.

In some configurations and referring to FIGS. 12–16, users are able to access a screen 170 to set up "calculation tags." (FIG. 33–37 illustrate configurations of alternative GUI windows that are used in some configurations of the present invention.) A "calculation tag" includes at least one calculation stage. Users can also append additional stages to a calculation tag (for example, by using a button 172 to access additional screens such as 174, 176, 178, and 180) to allow multiple successive calculations to determine the output value of a tag. Some configurations permit the configuration of five types of calculation stages, namely, "Formula," "Special Function," "Statistics," "Interpolation 2D," and "Interpolation 3D."

Some configurations of the present invention require the user to select a logging interval at which the calculations for the calculated tag are performed, and whether the calculated tag is logged to the database. As a consequence, this interval may be faster, slower and/or asynchronous with the rate at which input data for the calculated tag is generated.

When a user adds or edits a stage, some configurations of the present invention present the user with a screen to configure a single stage. When the user selects the stage type, the GUI changes to present appropriate choices for that stage type. For example, depending upon which stage type is selected in selection group 182, the GUI changes to screen 174, 176, 178, or 180, or some other screen.

Figure 13:
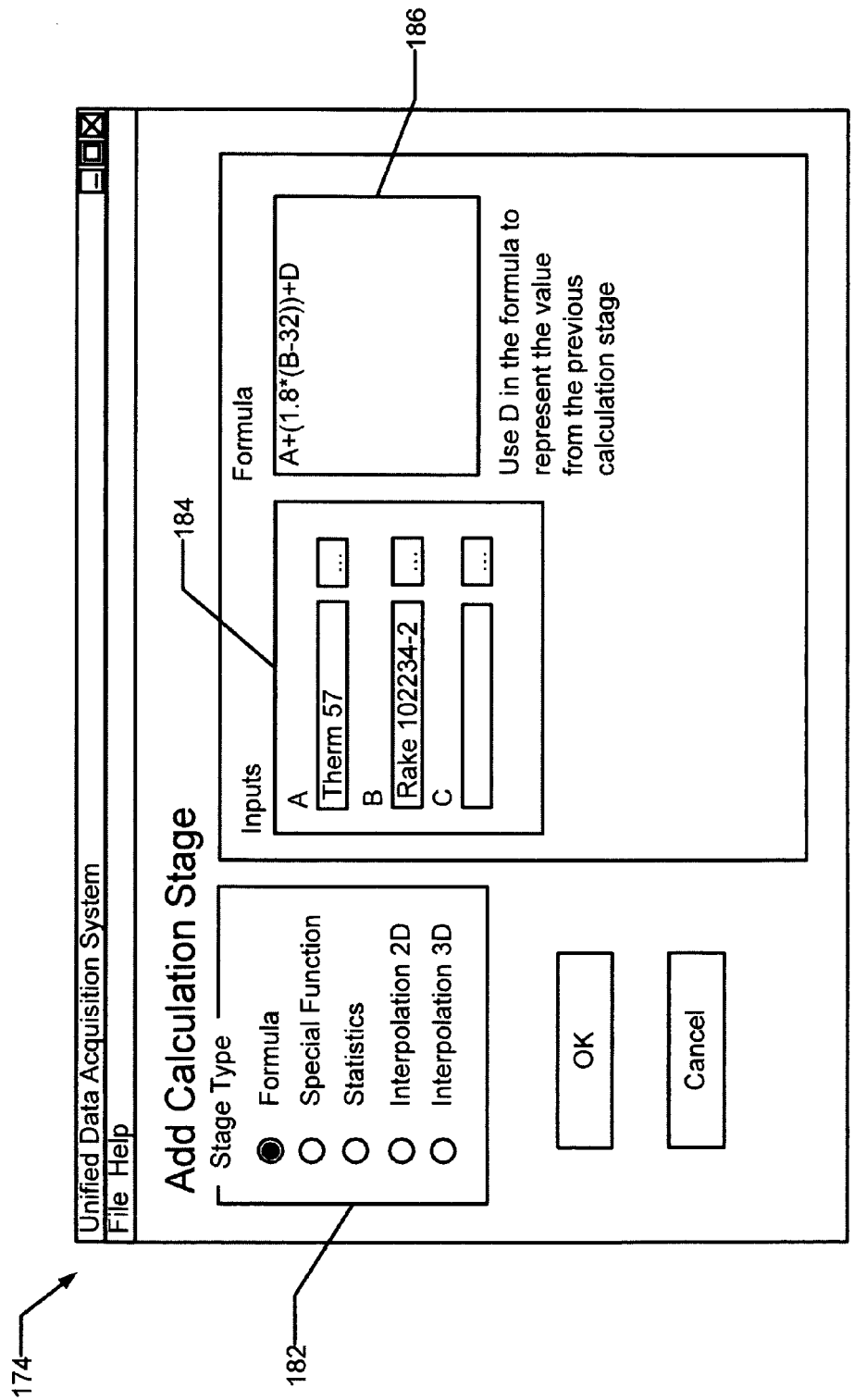

For formula calculation stages and referring to FIG. 13, some configurations of the present invention allow a user to enter up to three sTags as calculation inputs in an input area 184. Additionally, the user is able to specify the value of the output of the previous calculation stage by using, for example, the variable name "D" in the formula. The user is required to enter a formula in another input area 186 that is of the proper syntax to be processed. The formula syntax is the same as the syntax for a LabVIEW formula node in some configurations of the present invention.

Special Function Calculation Stage. A large variety of functions are made available in some configurations by making function calls to a dynamic link library (".DLL") file. When a function is selected, a subdialog box appears in some configurations of the present invention to prompt a user for input parameters specific to a selected function. For each parameter the user provides, the user can enter a static value or the name of another sTag. For example, if a user selects the Relative_Humidity function, the user is prompted to enter information for Dry Bulb Temperature, Wet Bulb Temperature and Barometric Pressure. The user can enter a static value, for example, 70° for dry bulb, and may, for example specify sTag names for sources of data for wet bulb and barometric pressure.

The following functions are provided in some configurations of the present invention: Air_Density, CompressorEfficiency, E_Back, EFF_Dry, EvapExitRH, EvapExitTemp, Flow_Annubar, Flow_FR, Flow_M, Fluid_Prop, GT_Airflow, GTDegradationHR, GTDegradationKW, H_FROM_T, HPS, HPT, HPTD, HPTL, K_Back, PHS, Poly, PSATT, PumpKW, Relative_Humidity, RH_to_SH, SH_to_RH, Specific_Humidity, Spline, SPTD, SPTL, T_From_H, TPH, TPHL, TSATP, Type_E, Type_J, Type_K, Type_R, Type_S, Type_T, VISL, VISV, VPHD, VPTD, VPTL, WB_FROM_RH, XPH, and XPS. In some configurations, the DLL does not block excessive amounts of time, thereby avoiding adverse affects on system throughput.

Figure 14:
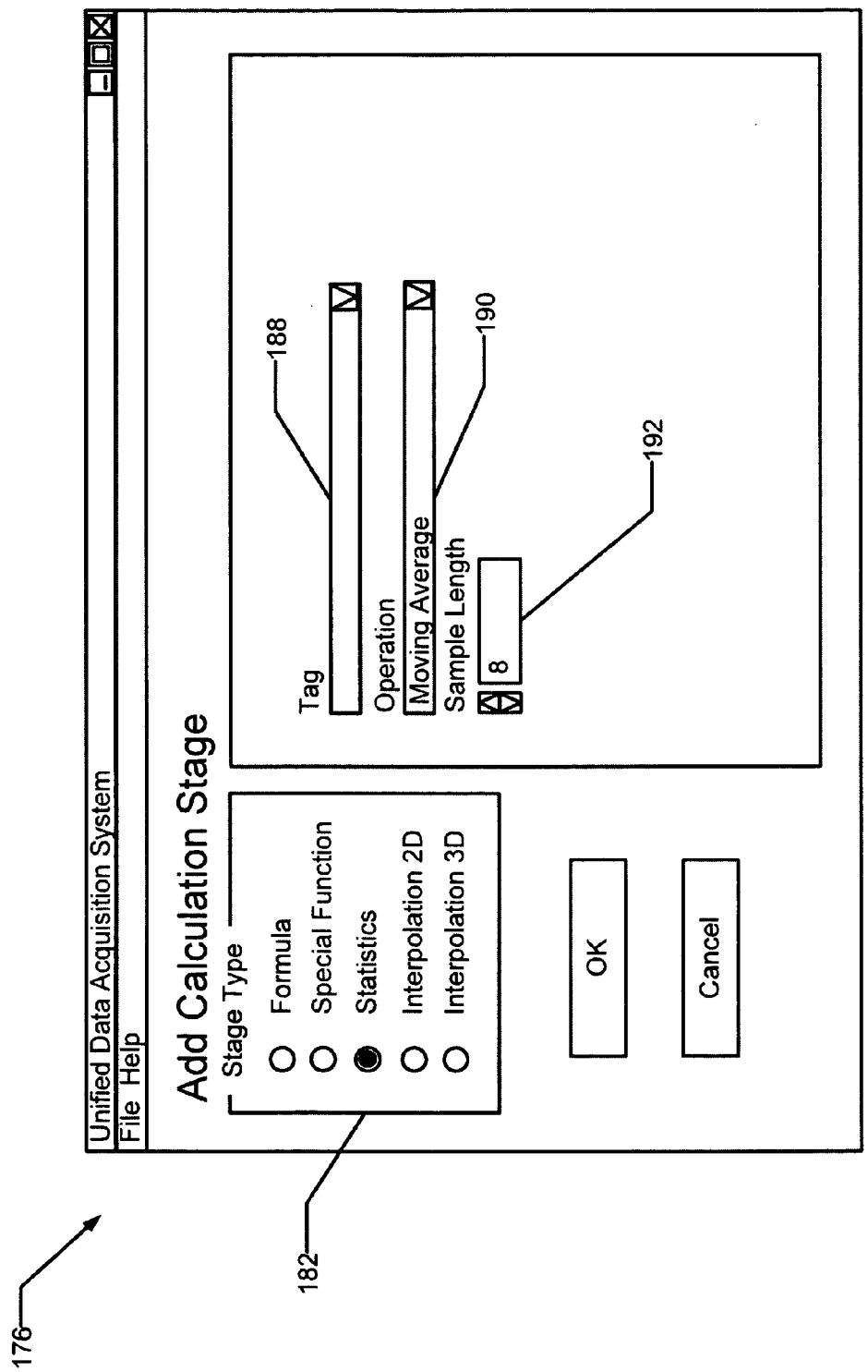

Referring to FIG. 14, For the "Statistics Calculation" state, some configurations of the present invention permit a user to perform "Moving Average," "Moving Min," "Moving Max," and "Standard Deviation" functions. The user enters an sTag at 188 as input for the function selected in a list 190 and selects a window (i.e., sample) length at box 192 for the function to operate upon. For example, if the selected sample length were 8, no data would be output from the stage until eight input points have been collected. Also for example, if the Moving Max function were selected, after 8 input points were collected, the Statistics Calculation stage would output one value, namely, the maximum value of points one through eight. When a ninth input point is collected, the Statistics calculation stage would output a second value, namely, the maximum value of points two through nine.

The sample length value in some configurations is restricted to be a static value in that a user is prevented from selecting an sTag as an input for the length.

Figure 15:
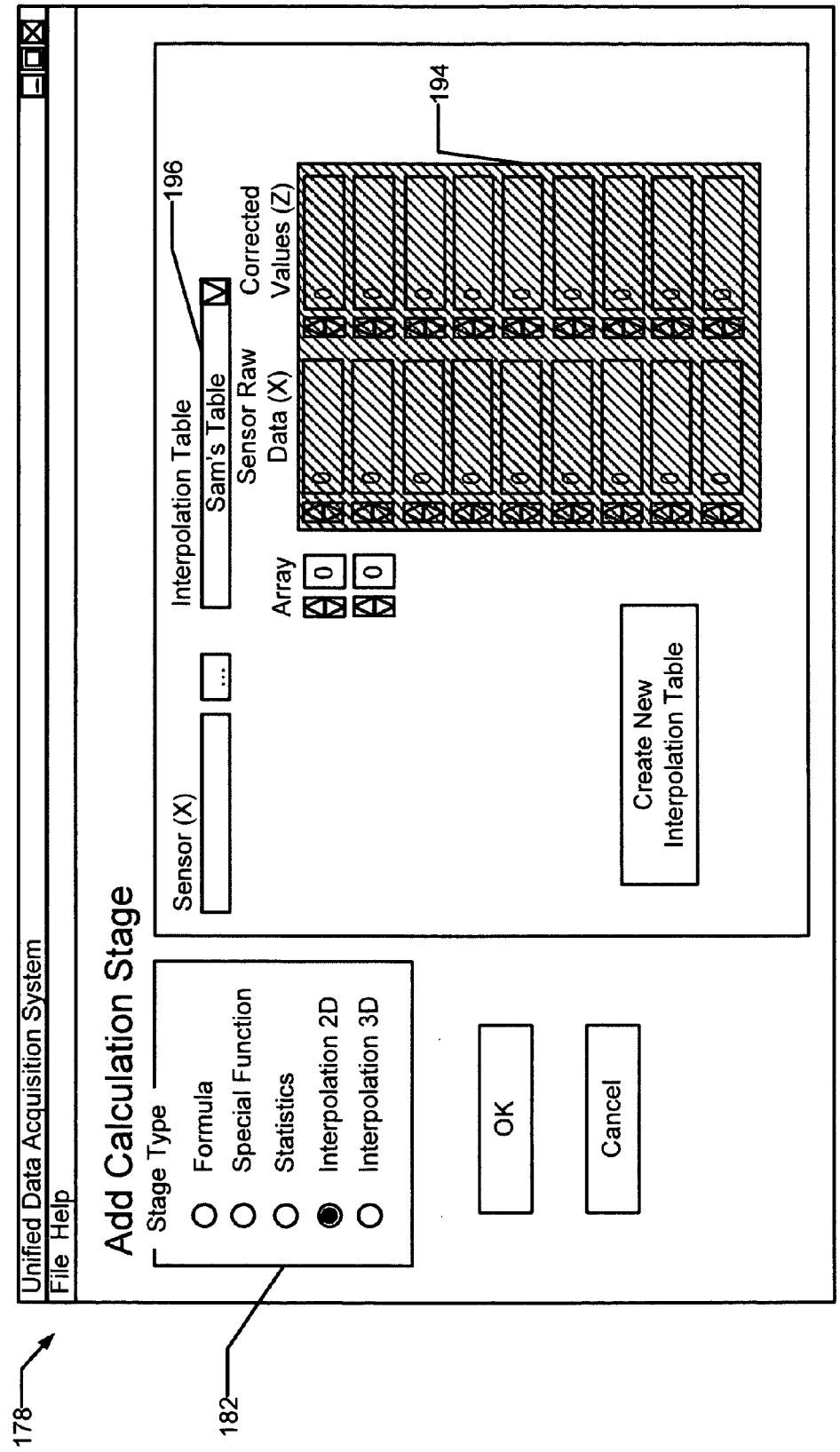

In some configurations and referring to FIG. 15, the "Interpolation 2D Calculation" stage allows a user to correct an sTag value according to a table 194 of user-defined values. The user is able to create a new interpolation table as well as select from a list 196 of existing tables. Input values that fall between the raw table values are interpolated on a straight line basis between the two closest values. If values fall above or below table values, an alarm is generated and no data is logged to the database.

Figure 16:
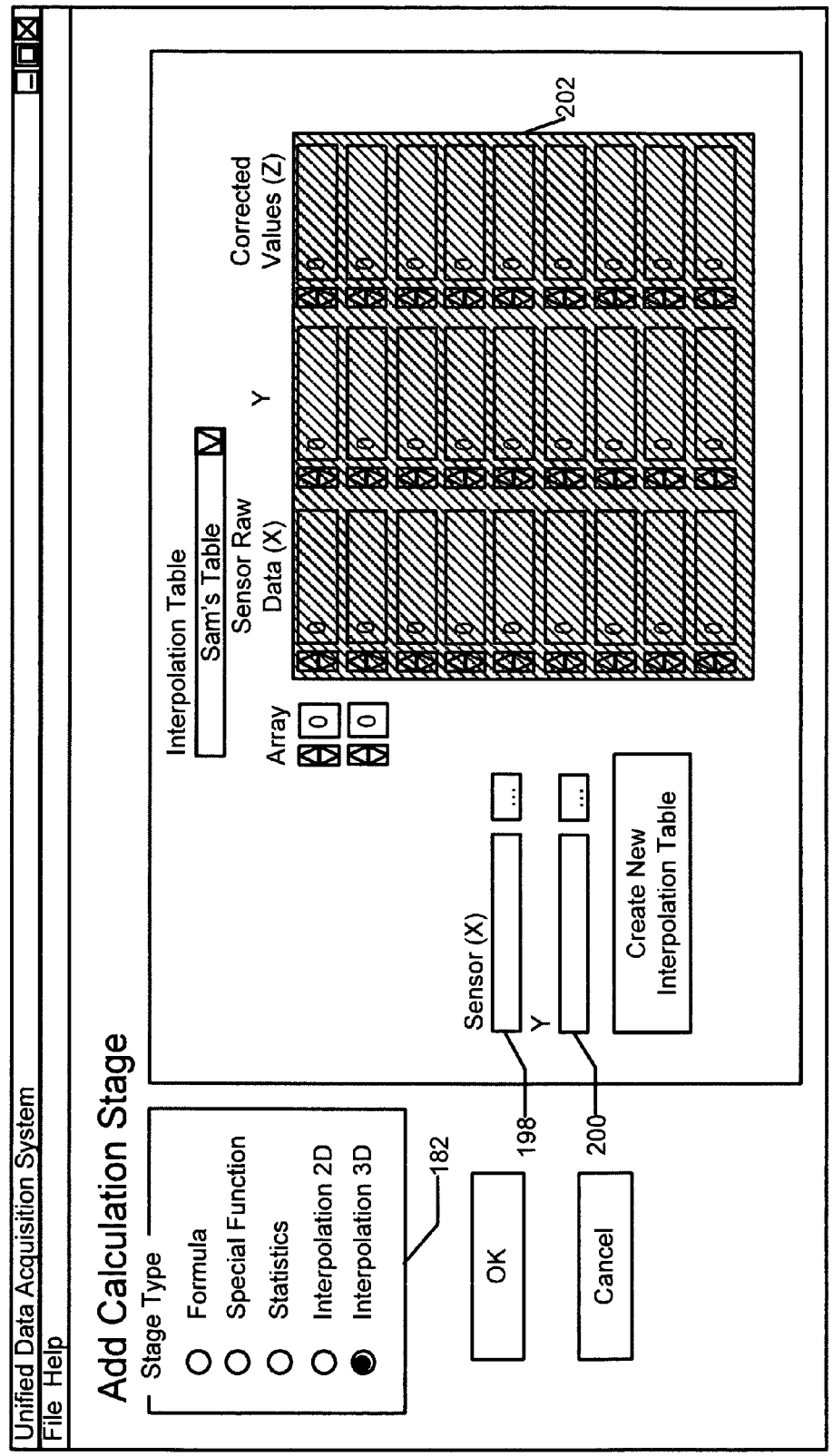

In some configurations and referring to FIG. 16, the "Interpolation 3D Calculation" stage is similar to the 2D Interpolation stage except that it interpolates two input values specified by the user at boxes 198 and 200 according to a user defined table 202 of X and Y values. The system calls a function that is supplied to perform the 3D interpolation. If values fall above or below table values an alarm is generated and no data will be logged to the database.

In some configurations of the present invention, input values to calculated tag functions allow other calculated tags as inputs. However, if a calculated tag uses another calculated tag as input, the actual data used for the calculation may be the result of a calculation from the previous time slice. There is no inherent order in which calculated tags are performed. In some configurations, any calculated tag uses data that is current at the time the calculation is performed. As a result, whether a calculated tag uses current data or data that is one time slice old will depend on the relative order in which the calculated tags are performed.

In various configurations of the present invention, data from data input device tags are always processed before any calculated tags. Therefore, input device data specified directly by a calculated tag is always fresh. Unlike a channel, a calculated tag does not have a raw version. Only one sTag is associated with a calculated tag.

Some configurations of the present invention are able to act as an OPC server. Any sTag defined is exposed as an available tag to a connecting OPC client. The value served to a connecting OPC client is the sTag's current value at the time the client makes the request. More particularly, a client request does not cause a new sTag value to be generated.

In various configurations, "Data Input" modules are responsible for collection of data from hardware devices or other sources of data such as the "PI Historian." Each interface comprises graphical user interfaces (GUIs) that interact with a user to provide configuration and diagnostics. In some configurations, each module logs data to a comma-separated value (CSV) formatted ASCII file. A CSV file is created for each day, so that all data for a given day is logged into one CSV file. The CSV file is given a name, which in some configurations is YYYYMMDD.CSV, wherein YYYY is a four digit year value, MM is a two digit month value, and DD is a two digit value representing the day on the month. Additionally, a timestamp field and a data source identifier field are logged. The format of the timestamp in some configurations of the present invention is MM/DD/YYYY HH:MM:SS.

In some configurations, some formatting of data is performed before the data is written to the CSV to facilitate reprocessing. Data values logged to the CSV are raw values in which no correction has been performed, except as noted below with respect to specific device descriptions.

Each module/device is able to scan its channels at a user-defined rate. This rate (i.e., the CSV rate) is also the rate at which data is logged to the CSV file.

In some configurations, during "point/channel" configuration for each data source, a user is able to specify an sTag name at 204 for each point/channel. The specified sTag name is compared against a list of standard sTag names. If the user-selected name is not a standard name, the user is notified and given an opportunity to change the sTag name. Along with the specified sTag name, a second sTag is automatically defined that contains the current raw data value of the channel. For example, the name given to the raw sTag in some configurations is the name specified by the user with "_RAW" appended to the end of the name.

Interfaces to the following devices are supported in some configurations:

A "Kaye Netpac" device communicates with the system over RS-485. The system provides a configuration utility for setting the bus address of the Netpac and the card configuration. Once the cards are configured, the user will be able to configure each channel (i.e., sTag). A diagnostic screen for this device allows the user to view all defined sTags and their current raw values in a tabular format. Values are updated at the CSV datafile rate. In some configurations, the system supports only the voltage/TC/current, High Voltage Input, and RTD Input Analog Input cards, and does not support digital I/O cards. Each channel is configurable for input type (TC-J, TC-K, RTD, voltage, etc). The user can assign an sTag name to each configured channel. Values written to the CSV are unprocessed data as is read from the Netpac. Both single module and multi-module configurations are supported in some configurations, and multiple Kaye Netpac device data sources are supported in some configurations.

An "HP3852" data acquisition and control unit uses GPIB to communicate with the instrument. Some configurations of the system support multiple HP3852s, but not the HP3853 Extender Card Cage. Some configurations support the HP 44701A/B Integrating Voltmeter card and the HP 44705A/H/F 20-Channel Relay Multiplexer card. Some configurations of the present invention provide the following configuration options for the HP3852: GPIB address, integration time length, and scan rate (which is also the rate at which data is logged to the CSV file). The Voltmeter card (44701) is assumed to be installed in slot zero and only one 44701 is allowed per HP3852 device in some configurations. Channels on the 44705 cards are available to be assigned as sTags. The user can create an sTag for channels 0–19 for any slot 1–7. If an sTag is configured for a channel that is nonexistent (i.e., no 44705 in the specified slot), an error message is generated on startup and the status for that sTag will show an error during run time. All values written to the CSV are unprocessed data as read from the HP3852. A diagnostic screen for this device allows the user to view all defined sTags and their current raw values in a tabular format. Values are updated at the CSV file rate.

A "Scanivalve SDIU" module provided in some configurations uses either RS-232 or GPIB to communicate with the device. Both interfaces can be supported and can be set as a configuration option in some configurations, and various configurations of the present invention support multiple Scanivalve devices. The following configuration options of the Scanivalve are presented to the user on a Scanivalve system basis: RS-232 or GPIB, Baud Rate, handshaking and parity (if RS-232), GPIB address (if GPIB), Number of Scanivalve ports, Encoder type, Position Input Sense, Home Port, Command mode, Max Step rate/RTR mode, and Number of A/D's installed. The following configuration options of the Scanivalve are presented to the user on a card basis (two A/Ds per card): A/D converter number and A/D Range. All values written to the CSV are unprocessed data as read from the SDIU. The diagnostic screen for the Scanivalve allows the user to view all defined sTags and their current raw values in a tabular format. Values are updated at the CSV datafile rate.

A "Yokogawa WT1030/AWT230 Power Meter" module provided in some configurations of the present invention uses GPIB to communicate with the meter. Various configurations of the present invention support multiple Yokogawa WT1030 or WT230 power meters. A configuration option is also provided to automatically synchronize local PC time with the Yokogawa meter time at the start of a test. The following signals are collected at a user selectable scan rate (i.e., CSV file rate): DTG, Volts A, Amps A, Watts A, pf A, Degrees A, IntA H, IntA M, IntA S, W-H A, Volts B, Amps B, Watts B, pf B, Degrees B, IntB H, IntB M, IntB S, W-H B, Volts C, Amps C, Watts C, pf C, Degrees C, IntC H, IntC M, IntC S, W-H C, V sum, I sum, W sum, pf sum, Deg sum, IntT H, IntT M, IntT S, W-H sum, and Freq. A user is able to create sTags for any of these signals. In some configurations, only those signals that have been configured as an sTag are logged to the CSV file. A DTG value read from the 1030 is used for a timestamp that is logged to the CSV file as well as for a timestamp written to the database after data corrections. Some configurations provide a diagnostic screen for Yokogawa 1030/230 meters that allow a user to view all of the Yokogawa 1030/230 sTags and their current raw values scanned at the user define CSV data file rate. The display that provides such viewing is provided in a tabular format.

Some configurations of the present invention provide a module "Honeywell PPT" that uses only RS-232/RS-485 to communicate with the up to 89 PPTs on each PPT network, and which support multiple PPT networks. Some configurations allow the user to assign an sTag name to each PPT based on a particular PPT's serial number. No other configuration settings are provided for the PPTs in some configurations of the present invention. The operational setup for all PPTs are statically defined. A diagnostic screen for the Honeywell PPT is provided to allow a user to view, in a tabular format, all of the PPT raw sTags and their current values scanned at the CSV file rate. The user is able to specify a scan rate for each PPT network. This scan rate determines a rate at which data is logged to the CSV file. STag names can be assigned only to the PPTs pressure data in some configurations, and sTag names cannot be assigned to the PPTs' temperature data.

An "OPC Server" device in some configurations of the present invention is a generic device that acts as an OPC client and is able to talk to a specified OPC server. Mark 5 PLC, Mark 6 PLC, and PI Historian devices are each accessed via their associated OPC servers in some configurations of the present invention. The configuration for these devices allows a user to associate a user-selectable sTag name for any OPC Server tag names defined. The configuration of the OPC tags is performed through the use of an appropriate OPC server configuration utility, which is not part of some configurations of the present invention but may be provided externally. A diagnostic screen for these devices allows a user to view, in a tabular format, all defined raw sTags and their current values scanned at a the CSV file rate. Multiple OPC Server devices are supported in some configurations of the present invention.

In some configurations of the present invention, during the process of setting up a Data Input Device, a user is able configure each channel (sTag) for the following items: "Channel tag name," "Serial#1," "Serial#2, ""Lower and Upper Alarm limits," "Log to database? (Yes/No)," "Database Logging Interval," "Turbine," "Data Corrections."

"Channel tag name" is the name that is used to specify a unique channel. Data logged to the database is logged to this name. This name is also used to configure inputs for other system functions such as calculated tags. The selected channel name is checked against a list of standard channel names. If the selected name is not a standard name the user is warned and given the opportunity to change the tag name, but the selected name is not disallowed.

Serial#1 is a sensor identifier

Serial#2 is a second sensor identifier

Lower and Upper Alarm limits are values that are compared against the corrected data values of the channel. If the data from the channel is below the lower limit or above the upper limit, an alarm is generated.

Log to database? (Yes/No) is a Boolean value that specifies whether the channel should be logged to the output database.

Database Logging Interval is a value selected by a user from a list of the database logging intervals specified on the start tab of the Main GUI.

Turbine is the turbine from which the channel is acquiring data. This selection determines the value of the Turbine Serial number (as set on the Start Test tab of the Main GUI) that is logged to the database along with the channel's processed data.

Data Corrections are as described below.

A display of current raw data and corrected data (Active Data) is shown in some configurations of the present invention. This display assists a user in visualizing the effect of adding and modifying corrections.

In some configurations of the present invention, a channel configuration dialog is available off-line (i.e., without devices attached to the system). The channel configuration dialog is viewable during a test run (while data is being logged to the database), but a user is unable to make changes to the configuration during a test run.

In some configurations of the present invention, a user can specify up to five correction parameters to apply to each channel. These corrections include (in order of application): "Hardware Correction," "Scaling," "Water Leg Correction," "Sensor Correction," and "Unit Conversion." A user can select to bypass any or all correction stages.

A hardware correction step applies a user defined multipoint interpolation table to the raw data values. The user is able to input a series of raw data values and corresponding corrected values. The actual raw data collected from the data input device uses the table values to correct the data before passing the data on to the next correction stage. Raw data values that fall in between table values are corrected using a straight line interpolation of the closest table values. If values fall outside of the table defined for corrections, an alarm is generated and no (corrected) data is logged to the database (although the raw value of the channel is logged to the database).

Figure 17:
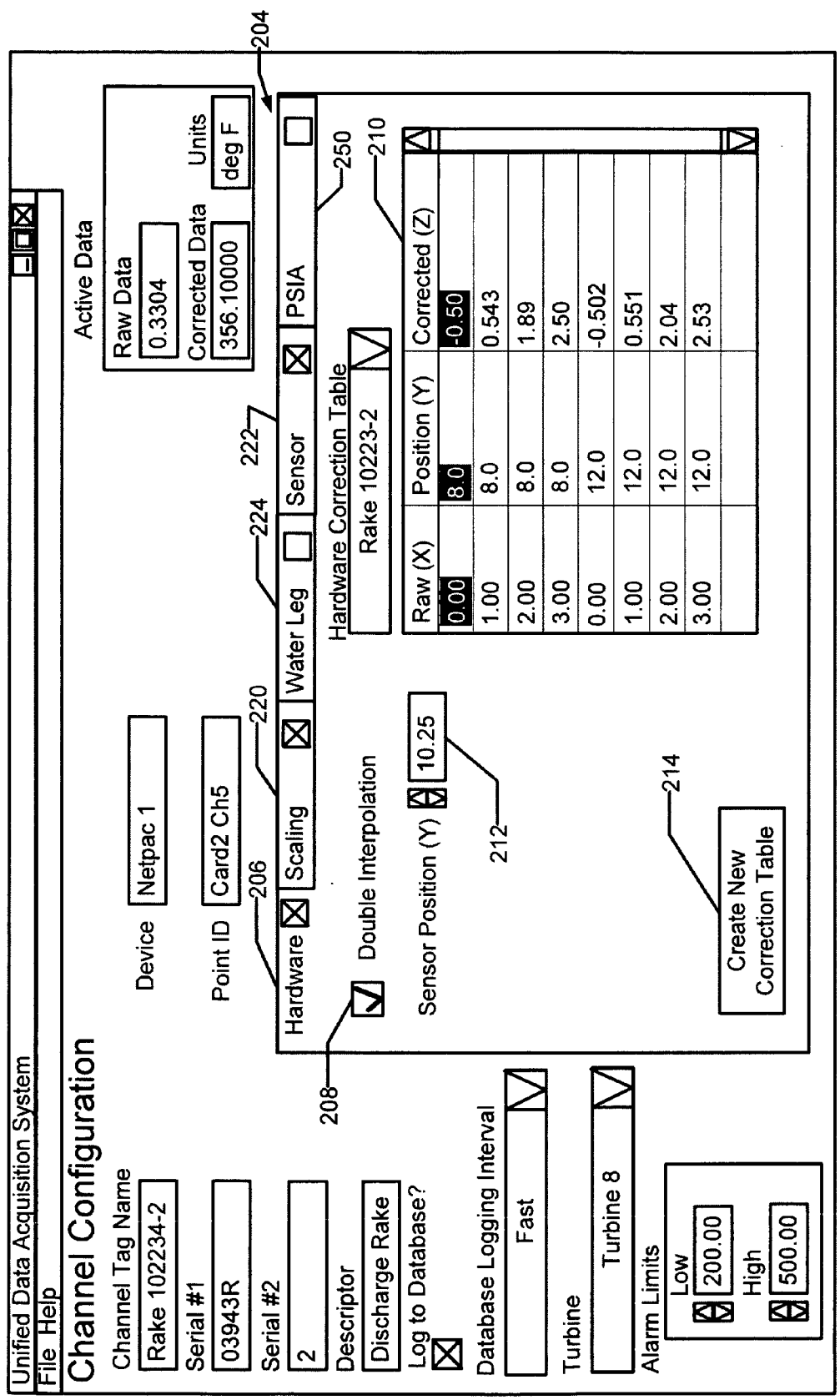
FIG. 17 is a screenshot of a configuration of a "Channel Configuration" screen that provides a facility for a double interpolation correction.
Figure 38:
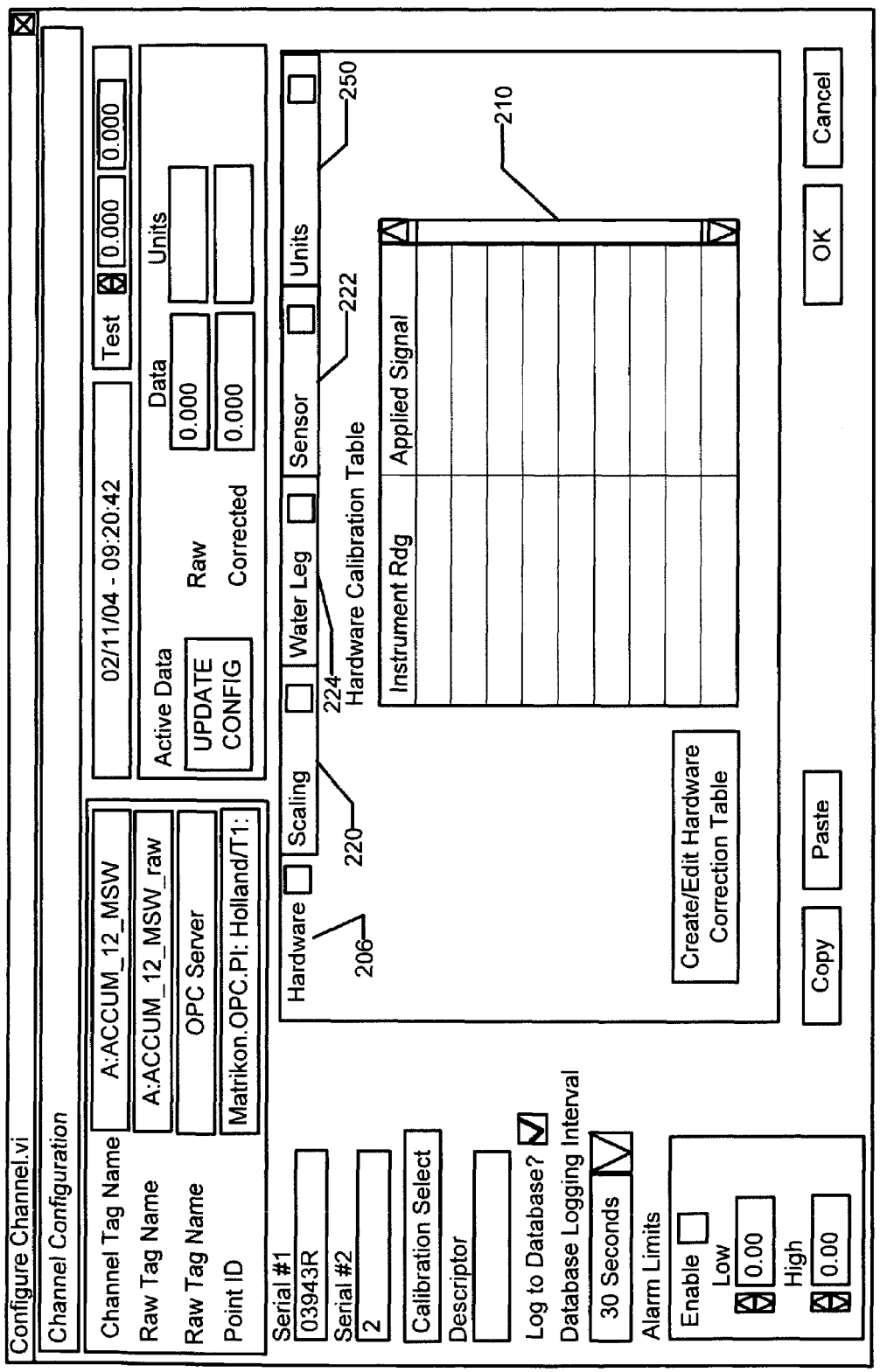
FIG. 38 is a screenshot of another configuration of a "Channel Configuration" screen.

In some configurations and referring to FIG. 17, a "Channel Configuration" dialog 204 includes a hardware correction tab 206 that provides a facility for a double interpolation correction. (FIG. 38 illustrates a configuration of an alternative GUI window that is used in some configurations of the present invention.) If a "Double Interpolation" checkbox 208 is selected, a data value will be corrected in accordance with two columns (X and Y) from a selected correction table 210. A final value of this correction stage is then determined by a call to an external function and by the sensor position value (Y) specified at box 212. If "Double Interpolation" checkbox 208 is not selected, a simple 2D interpolation is performed by ignoring Sensor Position (Y) value 212 and the Position (Y) column in correction table 210.

Figure 18:
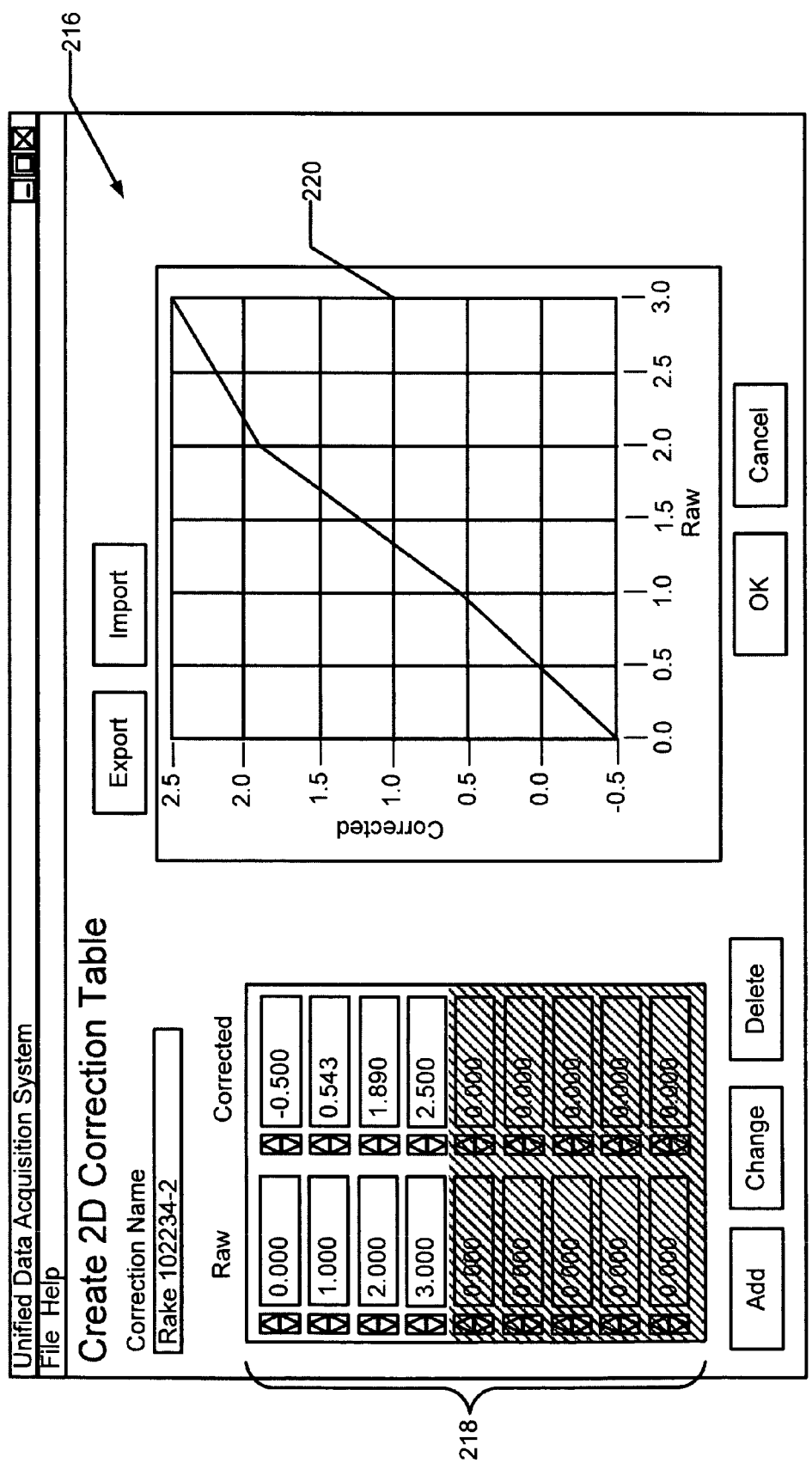
FIG. 18 is a screenshot of a configuration of a "Create Correction Table" screen.

To create a new correction table in some configurations, a user clicks on a "Create New Correction Table" button. Clicking this button causes a "Create Correction Table" dialog to appear. An exemplary configuration of a 2D Correction Table" dialog 216 as used in some configurations of the present invention is illustrated in FIG. 18. Data points can be added, edited and removed from the correction in boxes 218. A plot 220 is provided to show the correction graphically (for the 2D version only, in some configurations). An mx+b type correction can be created by entering a two point correction table. A user is able to import from previously stored correction files and can export a correction to a correction file.

Rake corrections are implemented in some configurations on a rake element basis (i.e., each rake element has a separate hardware correction).

Figure 39:
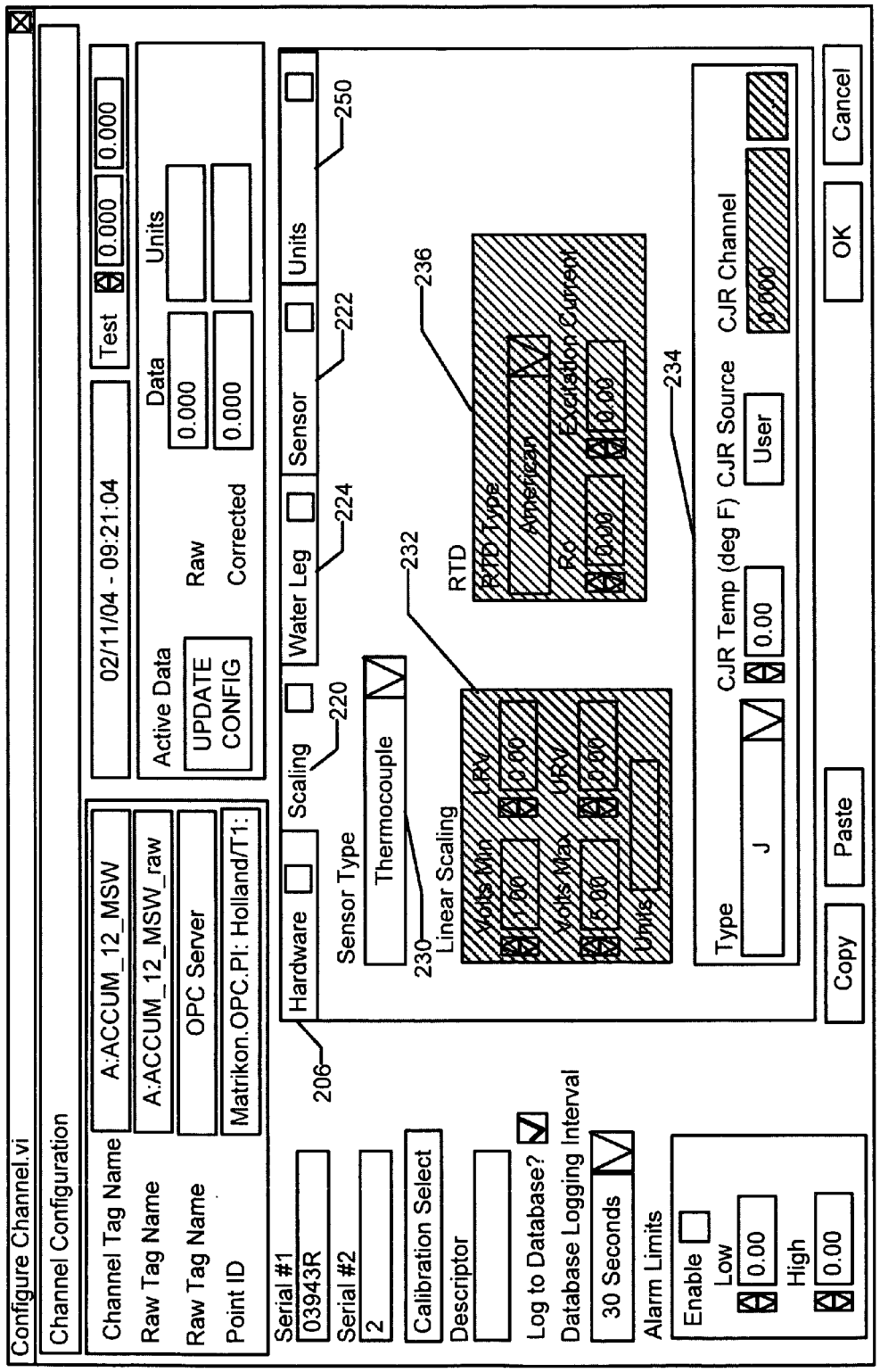
FIG. 39 is a screenshot of another configuration of a "Scaling Correction" stage.

In some configurations and referring to FIG. 19, a "Scaling Correction" stage is provided, which may be accessed by a tab 220. This correction stage allows a user to specify parameters to scale data from volts to engineering units. FIG. 39 illustrates a configuration of an alternative GUI window that is used in some configurations of the present invention.

Also in some configurations, a "Sensor Type" control 230 is available to allows a user to select thermocouple, RTD or linear scaling. If linear scaling is selected the values in a linear scaling box 232 are used to specify two points to linearly scale the data to engineering values. If any other value (e.g. Thermocouple-J) is selected, the Linear Scaling box is ignored. When the Thermocouple sensor type is selected, the user is prompted for Thermocouple Type, CJR Channel and CJR value in box 234. Either the CJR Channel or the CJR Value is used for the cold junction compensation depending on the value of the CJR Source toggle. Linearizations for American, ITS-90 and DIN 43760 RTDs are also supported in some configurations of the present invention. When an RTD sensor type is selected, the user is prompted for RTD Type, Ro and Excitation Current in box 236. The user can also select the desired units for the output data.

Figure 20:
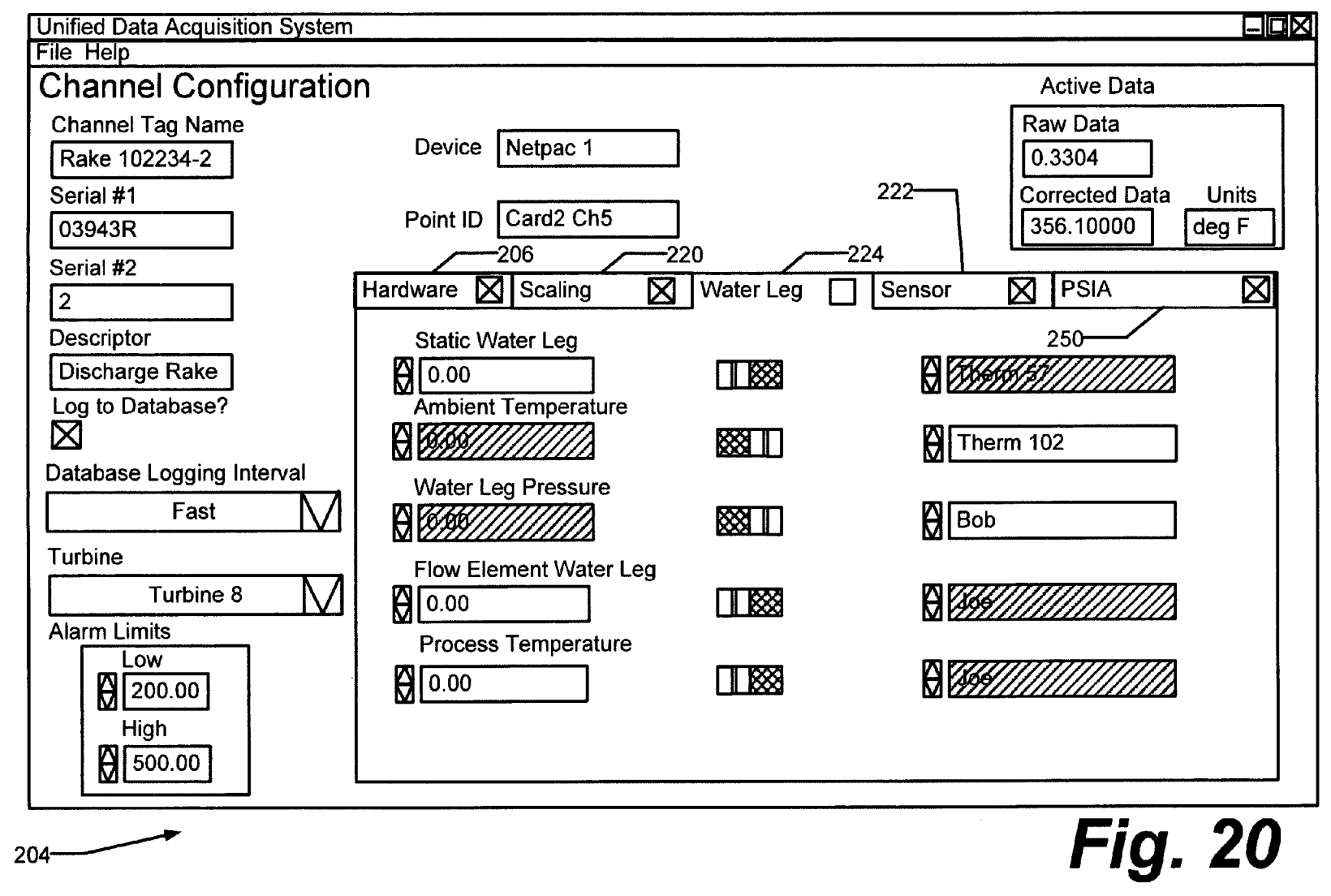
Figure 40:
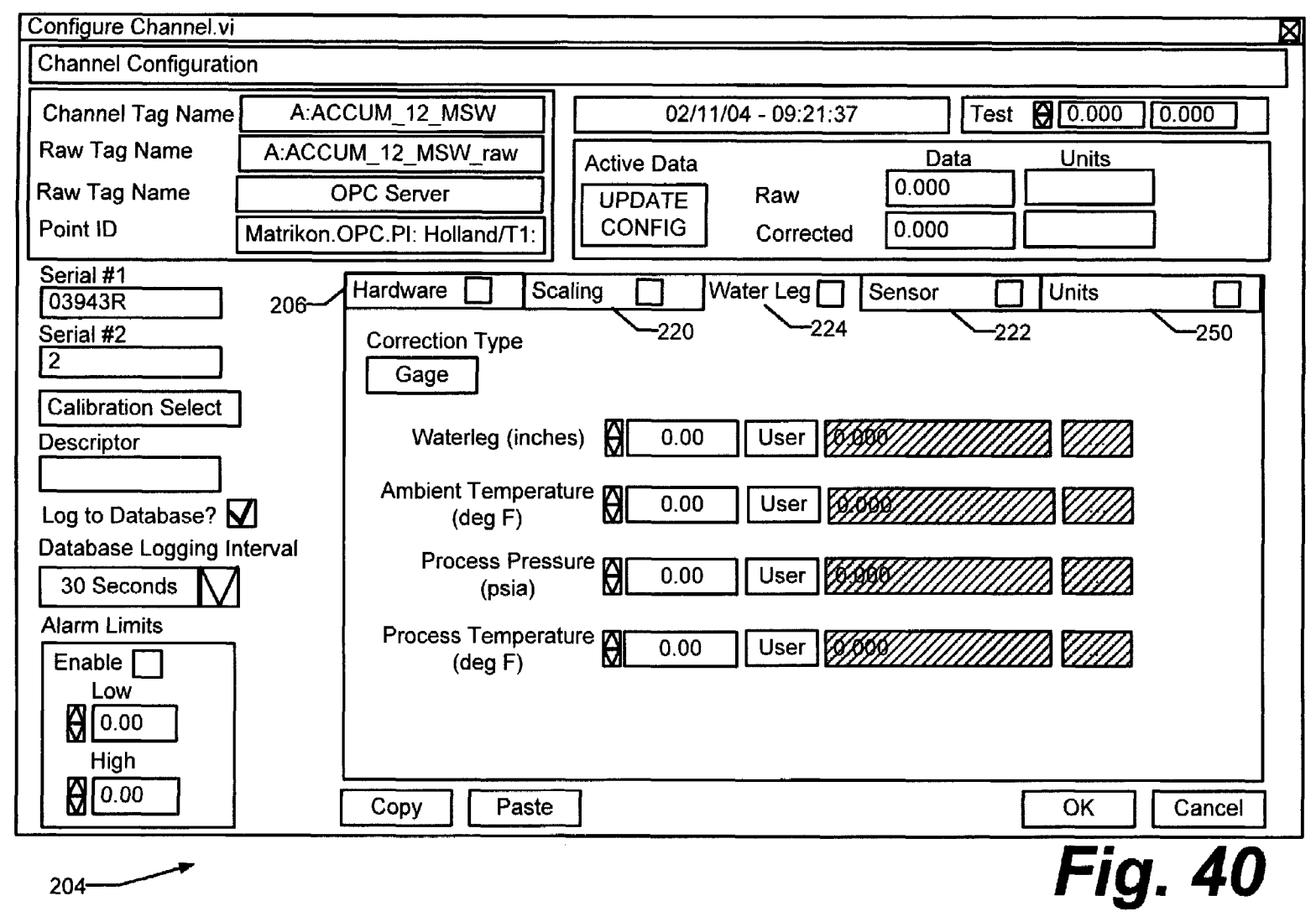

In some configurations and referring to FIG. 20, a "Water Leg Correction" accessible by a tab 224 is provided that allows a user to correct pressure reading offsets resulting from the vertical displacement of pressure sensors. (FIG. 40 illustrates a configuration of an alternative GUI window that is used in some configurations of the present invention.) The water leg correction algorithm is not supplied in some configurations of the present invention, but rather is an external function that can be called and used by the system. Five input parameters ("Static Water Leg," "Ambient Temperature," "Water Leg Pressure," "Flow Element Water Leg" and "Process Temperature") can be set to either static values or to current data values from other sTags in some configurations of the present invention.

Figure 41:
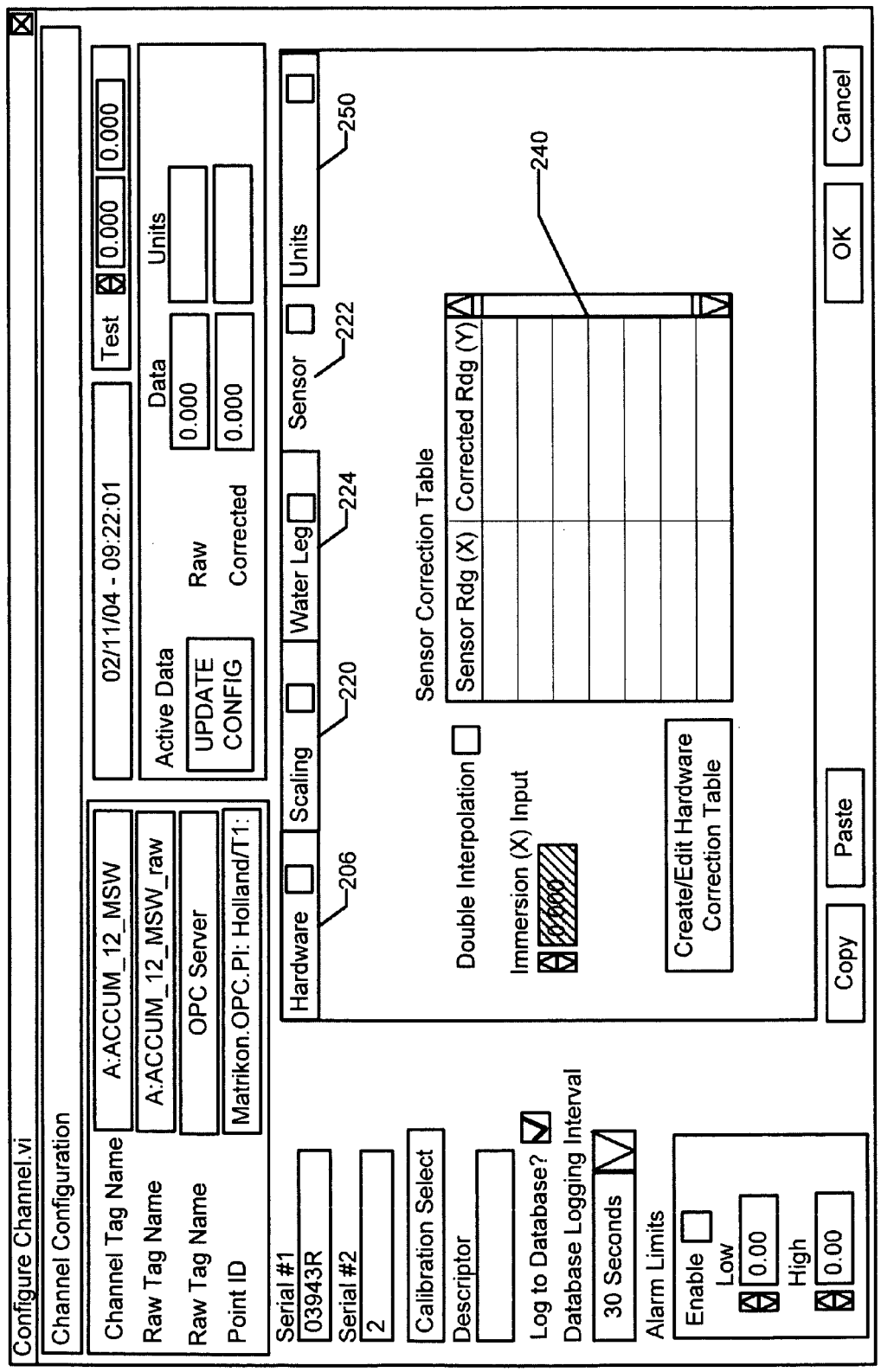
FIG. 41 is a screenshot of another configuration of a "Sensor Correction" screen.

In some configurations of the present invention and referring to FIG. 21, a "Sensor Correction" tab 222 is provided that accesses a correction table dialog 240 that is similar to hardware correction except that the former does not allow double interpolations and is applied after the data is converted to engineering units. (see Hardware Correction) FIG. 41 illustrates a configuration of an alternative GUI window that is used in some configurations of the present invention.

Figure 22:
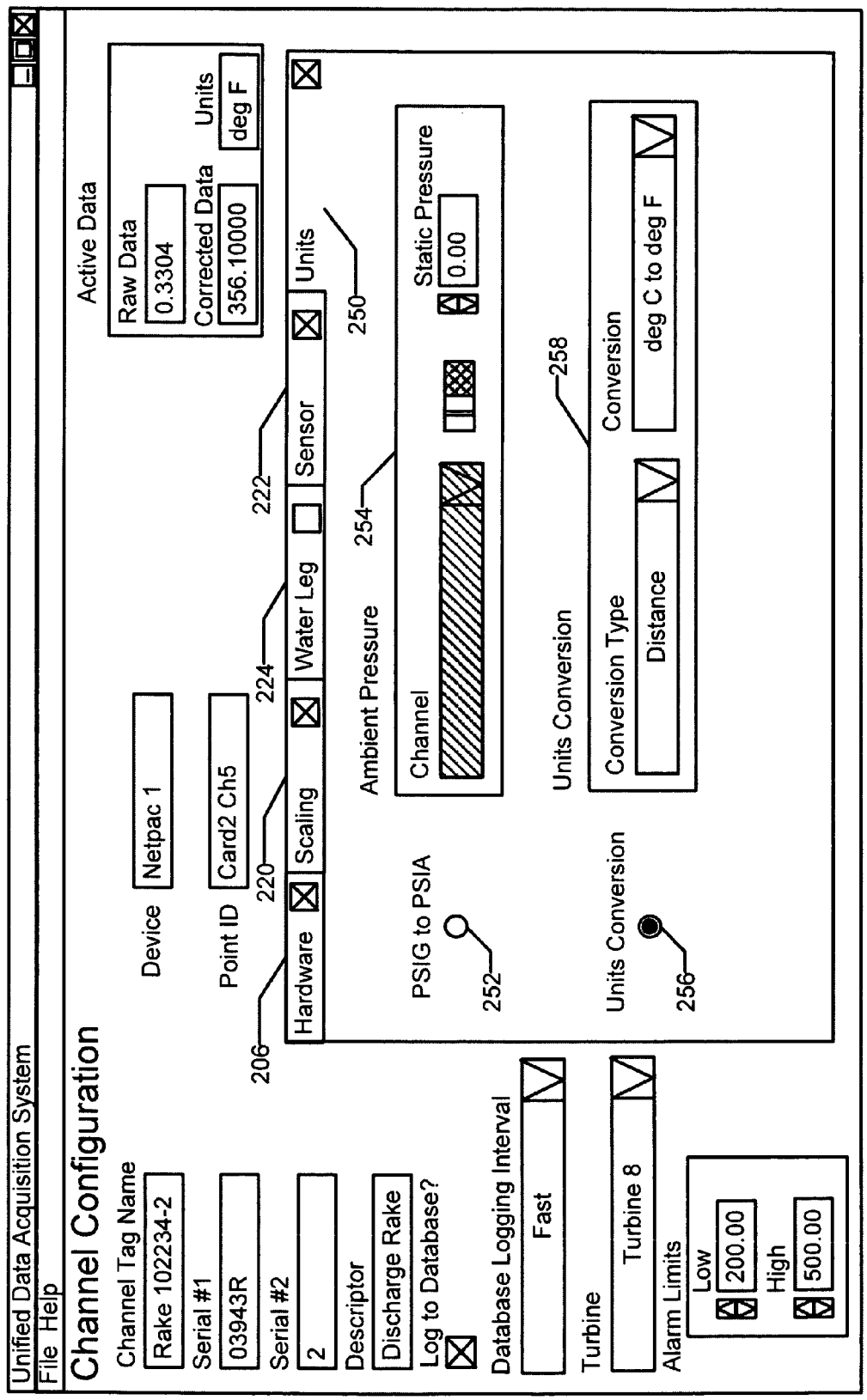
FIG. 22 is a screenshot of a configuration of a "Units Correction" screen.
Figure 25:
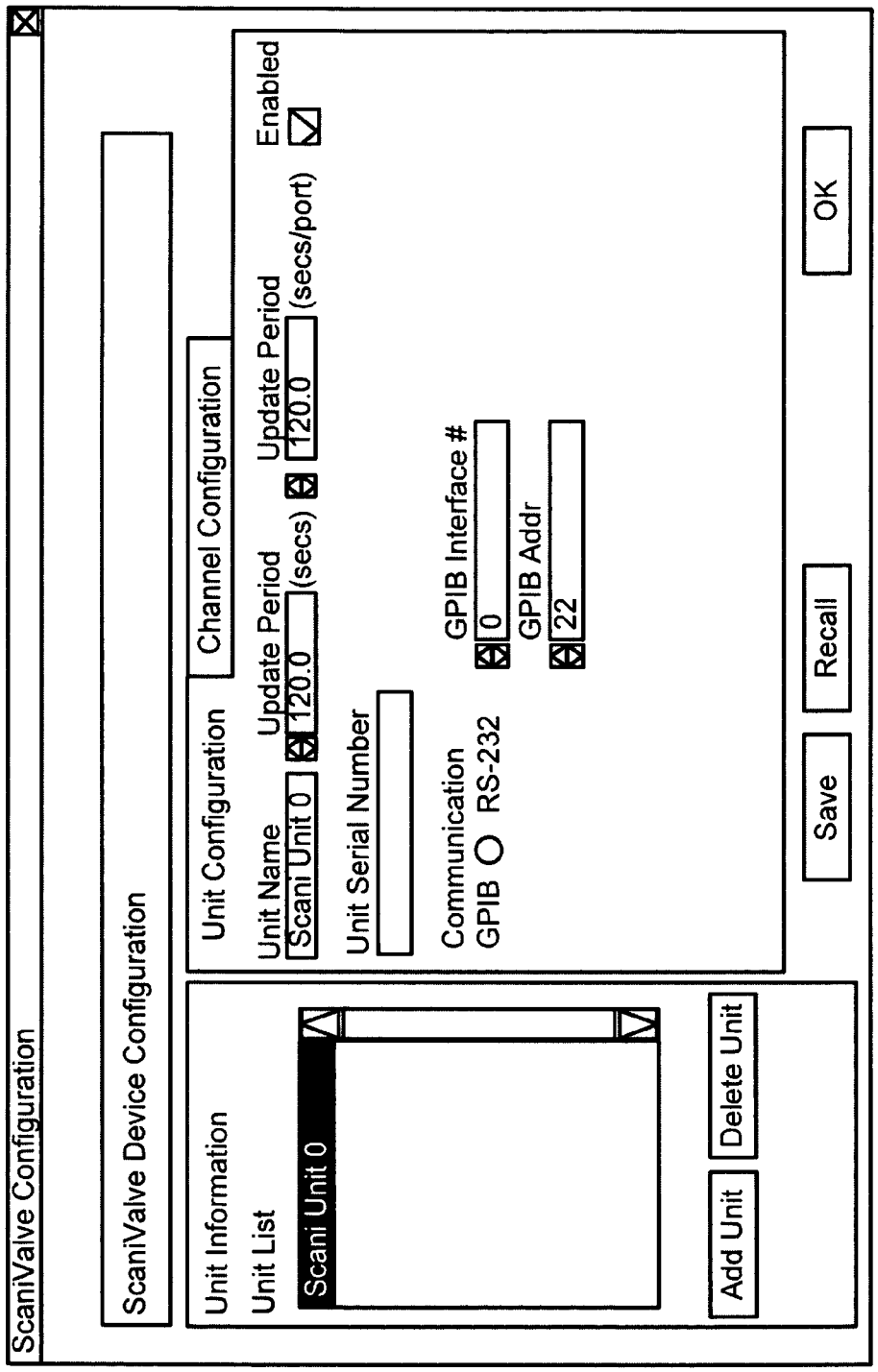
Figure 26:
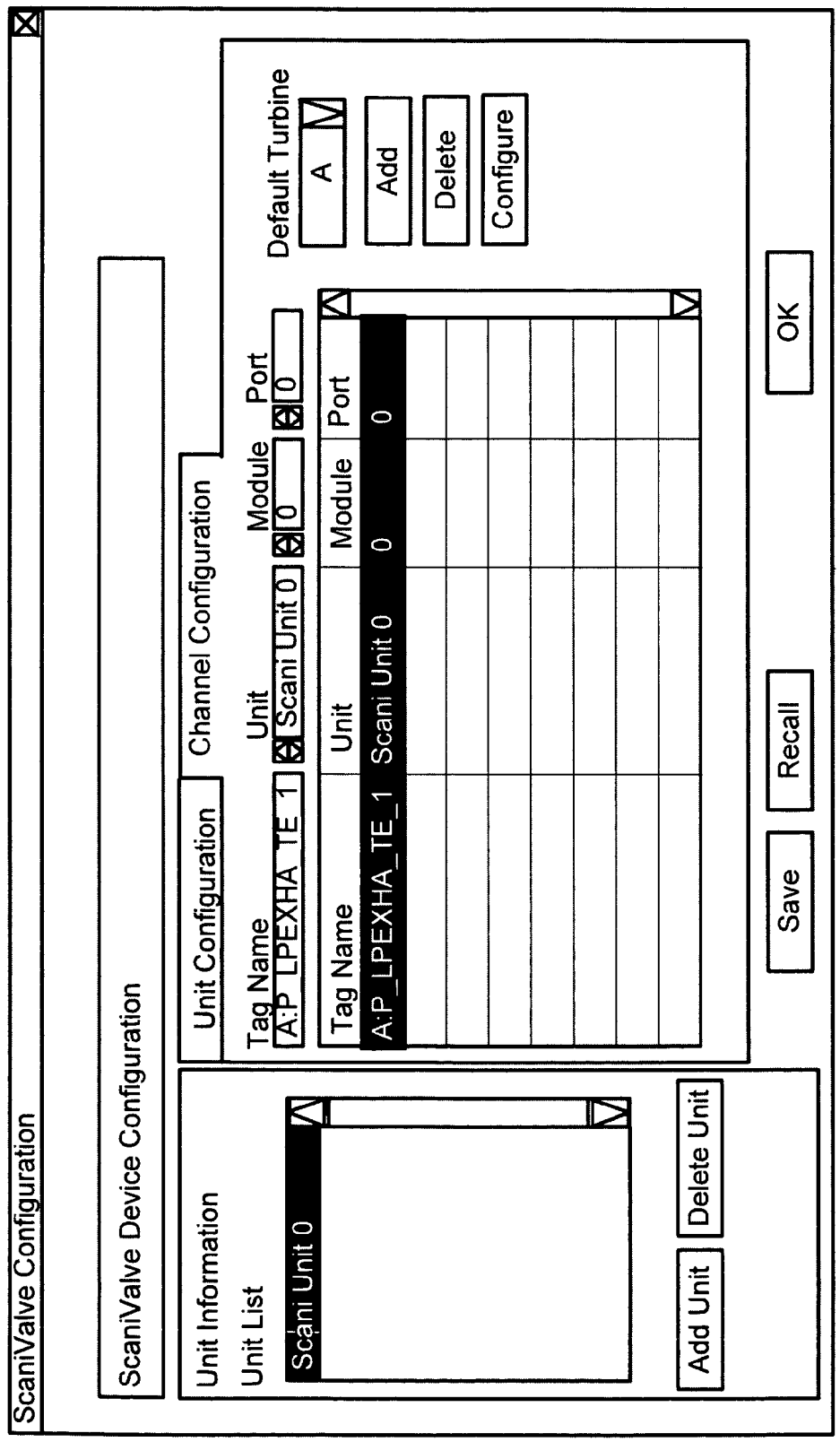
Figure 42:
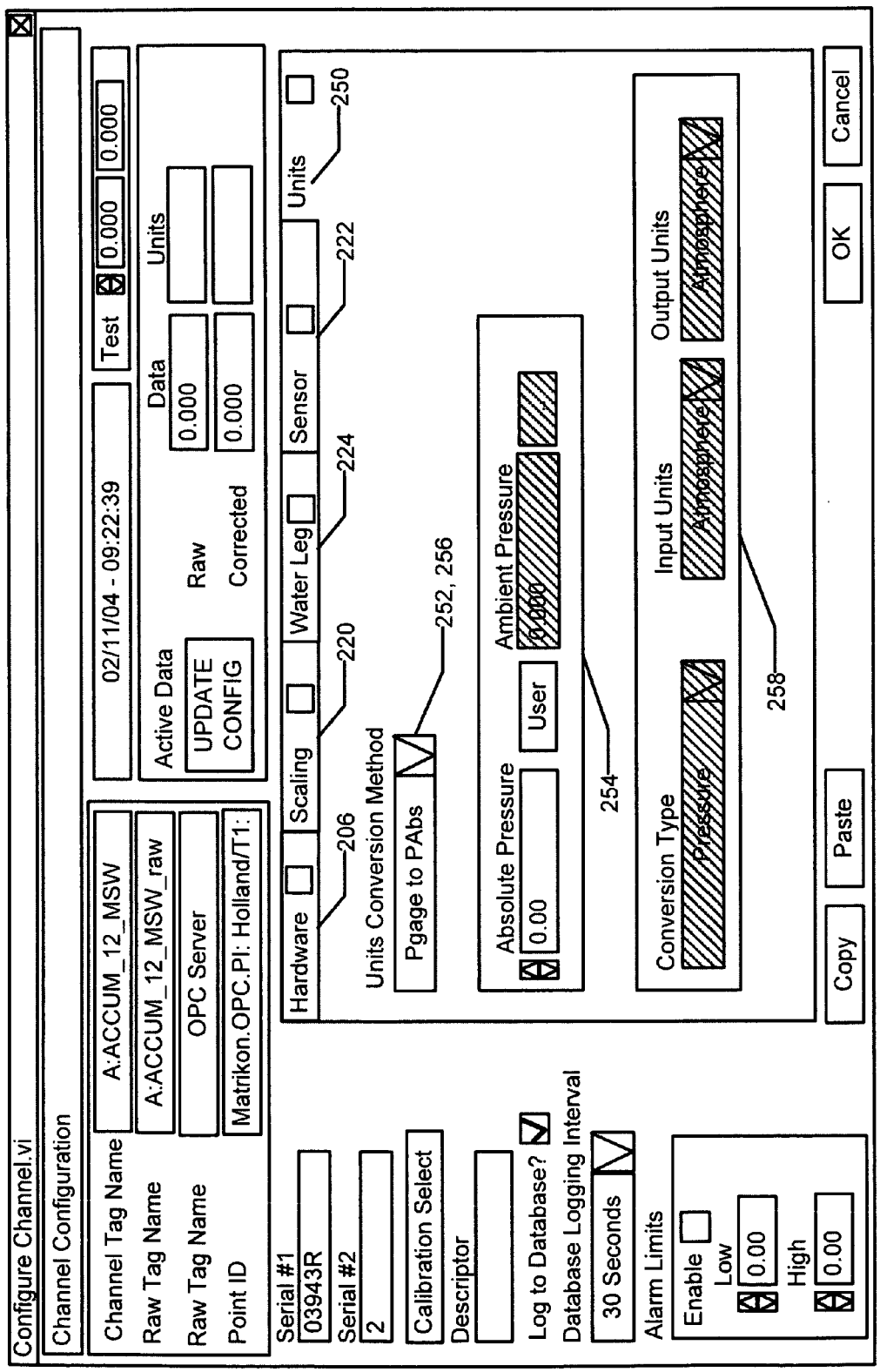
FIG. 42 is a screenshot of another configuration of a "Units Correction" screen.

In some configurations of the present invention and referring to FIG. 22, a "Units Correction" is accessible by a tab 250 can be applied in some configurations of the present invention. (FIG. 42 illustrates a configuration of an alternative GUI window that is used in some configurations of the present invention.) This correction allows a user to perform either a conversion of pressure readings from PSIG to PSIA by selecting radio button 252, or a general units conversion. In the case of a pressure conversion, the user is able to select either a channel value or a static value for the Ambient Pressure value in box 254. In the case of a general units conversion selected by radio button 256, the user is able to select a conversion type from a list that in some configurations includes "Pressure," "Temperature," "Mass," "Distance" and "Energy" in box 258. A secondary selection is made for the specific unit conversion. The software needed to perform the unit conversion is not supplied with some configurations of the present invention, but rather is an externally provided dynamic link library (DLL).

Upon startup of the system, a user is prompted for one or more configuration files that contain information relating to device and channel configuration. Missing devices result in the display of an error status in the device status screen and in the tag view screen of the missing device. The system permits a user to save the current system configuration for later use/recall.

All sTags marked for data base logging are logged to a local Personal Oracle database. In some configurations, a single rate is specified at which all data from all instruments are logged, irrespective of the CSV logging rate of the device. The actual interval used to log data may actually be longer than the specified interval dependent on system configuration (e.g., the number of sTags configured). Database logging starts when a "Start Test" button is clicked on the Start Test tab of the Main GUI.

In some configurations of UDAS, a "Reprocess Data Option" is provided that provides for the reprocessing of CSV data. This feature allows a user to select a CSV or set of CSVs for data processing, including conversions, corrections and calculations, and for writing to an output database.

Some configurations of the present invention run on a PC-compatible computer with a video display device providing a resolution of a 1024×768 pixels or better on a Microsoft® Windows® operating system platform.

Some configurations of the present invention also provide default values for tags. Thus, in some configurations, the default value for a tag is 0 (zero). If a tag is used before it has been initially processed, the value returned will be zero.

Some configurations of the present invention utilize additional off-the-shelf hardware and software. For example, at least one configuration is produced using licenses (including LabVIEW source code) for "Viewpoint Component Engine," "Viewpoint OPC Interface Component," "Viewpoint OPC Server Toolkit," "Viewpoint Datalogger Component," "Dbaser," and "Viewpoint System Tools." Some configurations utilize LabVIEW Professional Development System, version 6.1. A copy of the Personal Oracle database software for installation is provided in some configurations, along with a suitable ODBC driver for the Personal Oracle database.

In some configurations UDAS 50 time-synchronizes the logging of raw data from a plurality of sources in a comma-separated value formatted file, and time-synchronizes the logging of processed data from a plurality of sources in a relational database, such as the Personal Oracle database. This time synchronization makes it easier to recognize relationships between the data gathered from various sources.

It will thus be appreciated that both raw and processed data can be logged in some configurations. For example, in some configurations, raw data is logged to a CSV file format and processed data is stored to a personal Oracle database. Test status and current data can be viewable from remote locations via an Internet connection or using remote access software and a wired or wireless communication link such as a telephone line. Data collected into the data acquisition system can be stored into a local Oracle database and in addition, served up as OPC (OLE for Process Control) points. Remote access to the database reduces the need for long-term engineering and technician support, thereby providing a reduction in travel and living expenses in addition to on-site time required for delivering services.

It will be appreciated that configurations of the present invention provide portability and ease of configuration and setup, thereby making it possible to set up and test installations at a variety of different locations simply by setting up and configuring the portable test unit at each location to be tested. Configurations of the present invention can provide sufficient flexibility to use whatever data acquisition instrumentation is available at any given location at any given time, from a defined list. Additional instrumentation can be added as future needs require. Moreover, configurations of the present invention facilitate unification of collected data, i.e., all data can readily be collected into a single database, as well as facilitate viewing of data a remote support engineer or customer witness, and facilitate storage of data relationally on a central server for future studies. Also, some configurations of the present invention also facilitate calculation of real time performance results.

While the invention has been described in terms of various specific embodiments, those skilled in the art will recognize that the invention can be practiced with modification within the spirit and scope of the claims.

What is claimed is:

1. A unified data acquisition system (UDAS) comprising a portable computer configured to:
   monitor data from a system installation selected from the group consisting of gas turbine, steam turbine, combined cycle, and power generation system installations;
   log both raw and processed data from a plurality of data sources at said system installation; and
   permit relocation and reconfiguration of said UDAS at a different system installation for monitoring and logging of data at said different system installation, said UDAS is reconfigurable utilizing a graphical user interface to utilize a plurality of data acquisition instrumentation from a predefined list of said data acquisition instrumentation.

2. A UDAS in accordance with claim 1 wherein to log both raw and processed data from each said monitored installation, said UDAS is configured to log raw data in a comma separated value formatted file and said processed data in a relational database.

3. A UDAS in accordance with claim 2 configured to time-synchronize the logging of raw data from a plurality of sources in said comma separated value formatted file, and to time-synchronize the logging of processed data from a plurality of sources in said relational database.

4. A UDAS in accordance with claim 1 further configured to transmit test status and current data to a remote location.

5. A UDAS in accordance with claim 4 configured deployed as a performance monitor at a monitored system installation to process data from the monitored system installation essentially concurrently as it is received.

6. A UDAS in accordance with claim 4 wherein said UDAS is configurable to perform custom calculations with said data from the monitored installation utilizing instructions specified by a user of said UDAS.

7. A UDAS in accordance with claim 6 wherein said UDAS is further configured to offer a selection of preprogrammed performance testing functions to the user.

8. A method for acquiring data for thermal performance testing, said method comprising:
   utilizing a portable data acquisition system to monitor data from plurality of data sources at a system installation selected from the group consisting of gas turbine, steam turbine, combined cycle, and power generation system installations, wherein said portable data acquisition system comprises a personal computer relocatable and reconfigurable for monitoring and logging of data from different system installations;
   logging both raw and processed data from the monitored system installation; and
   reconfiguring said personal computer via a graphical user interface to utilize a plurality of data acquisition instrumentation from a prefined list of said data acquisition instrumentation.

9. A method in accordance with claim 8 wherein logging both raw and processed data further comprises logging raw data in a comma separated value formatted file and logging said processed data in a relational database.

10. A method in accordance with claim 9 wherein raw data is logged from a plurality of sources and processed data is logged from a plurality of sources, and further comprising time-synchronizing the logging of raw data from a plurality of sources in said comma separated value formatted file and time-synchronizing the logging of processed data from a plurality of sources in said relational database.

11. A method in accordance with claim 8 further comprising transmitting test status and current data to a remote location and processing data from the monitored installation essentially as it is received.

12. A method in accordance with claim 11 further comprising at least one of configuring the personal computer via a graphical user interface to perform custom calculations with said data from the monitored installation or selecting preprogrammed performance testing functions.

13. A machine readable medium having recorded thereon instructions executed by a processor for executed by a processor acquiring data for thermal performance testing, said instructions configured to:

instruct a portable data acquisition system to monitor data from plurality of data sources at a system installation selected from the group consisting of gas turbine, steam turbine, combined cycle, and power generation system installations, wherein said portable data acquisition system comprises a personal computer, and said instructions include instructions for monitoring and logging of data from different system installations;

log both raw and processed data from the monitored system installation;

reconfigure the personal computer via a graphical user interface to utilize a plurality of data acquisition instrumentation from a predefined list of said data acquisition instrumentation.

14. A machine readable medium in accordance with claim 13 wherein to log both raw and processed data, said instructions are further configured to log raw data in a comma separated value formatted file and to log said processed data in a relational database.

15. A machine readable medium in accordance with claim 14 wherein said instructions include instructions to log raw data from a plurality of sources and to log processed data from a plurality of sources, and said instructions further include instructions configured to time-synchronize the logging of raw data from a plurality of sources in the comma separated value formatted file and to time-synchronize the logging of processed data from a plurality of sources in said relational database.

16. A machine readable medium in accordance with claim 13 wherein said instructions further comprise instructions configured to transmit test data and current data to a remote location and to process data from the monitored installation essentially as it is received.

17. A machine readable medium in accordance with claim 16 further having instructions recorded thereon to at least one of configure the personal computer via a graphical user interface to perform custom calculations with said data from the monitored installation and provide preprogrammed performance testing functions selectable via said graphical user interface.

* * * * *

UNITED STATES PATENT AND TRADEMARK OFFICE
CERTIFICATE OF CORRECTION

PATENT NO. : 7,143,009 B2 Page 1 of 1
APPLICATION NO. : 11/013831
DATED : November 28, 2006
INVENTOR(S) : Patanian It is certified that error appears in the above-identified patent and that said Letters Patent is hereby corrected as shown below:

In Claim 8, column 16, line 66, delete "prefined" and insert therefor -- predefined --.
      In Claim 13, column 17, beginning on line 22, delete "instructions executed by a processor for executed by a processor acquiring" and insert therefor -- instructions executed by a processor for acquiring --.
      In Claim 13, column 17, line 34, after "system installation;" insert -- and --.

Signed and Sealed this

Fourth Day of December, 2007

JON W. DUDAS
*Director of the United States Patent and Trademark Office*